(12) United States Patent
Okuyama

(10) Patent No.: US 12,363,107 B2
(45) Date of Patent: *Jul. 15, 2025

(54) AUTHENTICATION SERVER, AUTHENTICATION SYSTEM, CONTROL METHOD OF AUTHENTICATION SERVER, AND STORAGE MEDIUM

(71) Applicant: NEC Corporation, Tokyo (JP)

(72) Inventor: Yoshiaki Okuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 137 days.

This patent is subject to a terminal disclaimer.

(21) Appl. No.: 17/916,113

(22) PCT Filed: Apr. 10, 2020

(86) PCT No.: PCT/JP2020/016177
§ 371 (c)(1),
(2) Date: Sep. 30, 2022

(87) PCT Pub. No.: WO2021/205660
PCT Pub. Date: Oct. 14, 2021

(65) Prior Publication Data
US 2023/0164142 A1 May 25, 2023

(51) Int. Cl.
*H04L 9/40* (2022.01)
(52) U.S. Cl.
CPC .................. *H04L 63/0861* (2013.01)
(58) Field of Classification Search
CPC .................................................. H04L 63/0861
See application file for complete search history.

(56) References Cited

U.S. PATENT DOCUMENTS 6,996,718 B1 * 2/2006 Henry ............... G06F 21/41
  713/184
7,202,773 B1 * 4/2007 Oba ............... H04L 63/0853
  713/168

(Continued)

FOREIGN PATENT DOCUMENTS

EP      3416334 B1      1/2020
JP      2002-042102 A   2/2002

(Continued)

OTHER PUBLICATIONS

International Search Report for PCT Application No. PCT/JP2020/016177, mailed on Aug. 4, 2020.

(Continued)

*Primary Examiner* — Jason Chiang
(74) *Attorney, Agent, or Firm* — Sughrue Mion, PLLC

(57) ABSTRACT

An authentication server includes a user registration unit, a service registration unit, and a storage unit. The user registration unit acquires a first ID that uniquely determines a user in a system and first biological information that is used for authentication of the user. The service registration unit processes a service registration request that is transmitted from a service provider of a service that the user wishes to use and that includes the first ID and a second ID that identifies the service provider. The service registration unit generates a third ID that is uniquely determined by a combination of the user and the service provider and transmits the third ID to the service provider. The storage unit stores the first biological information, the first ID, the second ID, and the third ID in association with each other.

13 Claims, 25 Drawing Sheets

(56) References Cited

U.S. PATENT DOCUMENTS

| | | | | |
|---|---|---|---|---|
| 9,098,850 | B2* | 8/2015 | Weiner | H04L 63/083 |
| 9,106,426 | B2 | 8/2015 | Schneider | |
| 10,129,252 | B1 | 11/2018 | Suen | |
| 2003/0046541 | A1* | 3/2003 | Gerdes | H04W 12/068 |
| | | | | 713/168 |
| 2004/0034502 | A1* | 2/2004 | Jung | H04L 63/08 |
| | | | | 702/178 |
| 2005/0222860 | A1 | 10/2005 | Kawaoka et al. | |
| 2006/0064588 | A1 | 3/2006 | Tidwell et al. | |
| 2007/0044146 | A1* | 2/2007 | Murase | G06F 21/33 |
| | | | | 713/173 |
| 2007/0130343 | A1* | 6/2007 | Pardo-Blazquez | H04L 63/168 |
| | | | | 709/227 |
| 2010/0002250 | A1* | 1/2010 | Sakagami | H04L 63/0853 |
| | | | | 358/1.14 |
| 2011/0197218 | A1* | 8/2011 | Wagner | H04L 63/0815 |
| | | | | 725/30 |
| 2012/0005340 | A1* | 1/2012 | Takenouchi | G06F 21/31 |
| | | | | 709/224 |
| 2012/0005732 | A1* | 1/2012 | Shinzaki | G06F 21/32 |
| | | | | 726/6 |
| 2012/0229838 | A1* | 9/2012 | Mogaki | G06F 21/608 |
| | | | | 358/1.14 |
| 2013/0024919 | A1* | 1/2013 | Wetter | H04L 63/083 |
| | | | | 726/6 |
| 2013/0170717 | A1* | 7/2013 | Yabuki | G07C 9/37 |
| | | | | 382/115 |
| 2013/0219461 | A1* | 8/2013 | Esaki | H04L 63/08 |
| | | | | 726/1 |
| 2014/0040628 | A1* | 2/2014 | Fort | H04L 63/18 |
| | | | | 713/182 |
| 2014/0109129 | A1* | 4/2014 | Fujii | H04N 21/4751 |
| | | | | 725/25 |
| 2014/0289798 | A1* | 9/2014 | Kaneshiro | G06F 21/31 |
| | | | | 726/3 |
| 2015/0089632 | A1* | 3/2015 | Bartholomew | G06F 21/629 |
| | | | | 726/17 |
| 2015/0135286 | A1* | 5/2015 | Egan | H04L 63/0884 |
| | | | | 726/5 |
| 2016/0072802 | A1* | 3/2016 | Hoyos | G06F 16/9535 |
| | | | | 726/5 |
| 2016/0308862 | A1 | 10/2016 | Rolfe | |
| 2017/0055146 | A1* | 2/2017 | Ko | H04W 12/068 |
| 2017/0171200 | A1* | 6/2017 | Bao | H04L 9/3213 |
| 2017/0244692 | A1* | 8/2017 | Bhupathiraju | H04L 63/083 |
| 2018/0062863 | A1* | 3/2018 | Baskaran | H04L 63/067 |
| 2018/0145827 | A1* | 5/2018 | Pitel | G06F 21/14 |
| 2018/0285880 | A1* | 10/2018 | Jerstroem | G07F 9/001 |
| 2019/0073470 | A1* | 3/2019 | Shirakawa | G06F 21/604 |
| 2019/0118773 | A1* | 4/2019 | Choi | G06F 21/32 |
| 2019/0149334 | A1 | 5/2019 | Van Der Velden | |
| 2019/0158702 | A1* | 5/2019 | Shirakawa | H04N 1/00384 |
| 2019/0334884 | A1 | 10/2019 | Ross et al. | |
| 2019/0334889 | A1* | 10/2019 | Ito | H04L 63/0853 |
| 2019/0384934 | A1 | 12/2019 | Kim | |
| 2020/0068399 | A1* | 2/2020 | Brown | H04L 9/3236 |
| 2020/0145502 | A1* | 5/2020 | Burch | H04L 67/306 |
| 2020/0195628 | A1* | 6/2020 | Duro | H04L 63/20 |
| 2020/0195636 | A1* | 6/2020 | Landrock | H04L 63/0861 |
| 2021/0211292 | A1* | 7/2021 | Kim | H04L 9/3242 |
| 2021/0306330 | A1* | 9/2021 | Kawaguchi | H04L 63/0861 |
| 2021/0367936 | A1* | 11/2021 | Neumann | H04W 12/40 |
| 2022/0058594 | A1* | 2/2022 | Hasegawa | G06Q 20/14 |
| 2023/0088787 | A1* | 3/2023 | Omori | H04L 9/50 |
| | | | | 713/168 |

FOREIGN PATENT DOCUMENTS

| | | |
|---|---|---|
| JP | 2005-148982 A | 6/2005 |
| JP | 2005-284399 A | 10/2005 |
| JP | 2005-339308 A | 12/2005 |
| JP | 2008-015926 A | 1/2008 |
| JP | 2008-033805 A | 2/2008 |
| JP | 2012-003648 A | 1/2012 |
| JP | 2015-207205 A | 11/2015 |
| JP | 2017-175244 A | 9/2017 |
| JP | 2018-101235 A | 6/2018 |
| JP | 2019-096077 A | 6/2019 |
| JP | 2019-101504 A | 6/2019 |
| JP | 2019-192034 A | 10/2019 |
| JP | 2020-005064 A | 1/2020 |
| JP | 2020-057267 A | 4/2020 |
| JP | 7124988 B2 | 8/2022 |
| JP | 7151928 B2 | 10/2022 |
| WO | 2010/103683 A1 | 9/2010 |
| WO | 2010/110182 A1 | 9/2010 |
| WO | 2016/194878 A1 | 12/2016 |

OTHER PUBLICATIONS

Written opinion for PCT Application No. PCT/JP2020/016177. mailed on Aug. 4, 2020.
JP Office Action for corresponding JP Application No. JP2022-514291, mailed on Jul. 12, 2022 with English translation.
JP Office Action for corresponding JP Application No. JP2022-126024, mailed on Aug. 16, 2022 with English translation.
JP Office Action for corresponding JP Application No. JP2022-126024, mailed on Aug. 30, 2022 with English translation.
International Search Report of PCT Application No. PCT/JP2020/016178 mailed Aug. 4, 2020.
Written opinion for PCT Application No. PCT/JP2020/016178, mailed on Aug. 4, 2020.
International Search Report of PCT Application No. PCT/JP2020/016174 mailed Aug. 4, 2020.
Written opinion for PCT Application No. PCT/JP2020/016174. mailed on Aug. 4, 2020.
JP Office Action for JP Application No. 2022-153451, mailed on Dec. 27, 2022 with English Translation.
JP Office Action for JP Application No. 2023-038180, mailed on Apr. 24, 2024 with English Translation.
Extended European Search Report for EP Application No. 20930459.1, dated on May 8, 2023.
US Office Action for U.S. Appl. No. 17/916,599, mailed on Sep. 5, 2024.

* cited by examiner

FIG. 9

AUTHENTICATION INFORMATION DATABASE

| USER ID (uID) | PASSWORD (PW) | FEATURE VALUES | SERVICE PROVIDER ID (spID) | SERVICE USER ID (suID) |
|---|---|---|---|---|
| ... | ... | ... | ... | ... |
| U1 | PW1 | FV1 | — | — |

FIG. 10

AUTHENTICATION INFORMATION DATABASE

| USER ID (uID) | PASSWORD (PW) | FEATURE VALUES | SERVICE PROVIDER ID (spID) | SERVICE USER ID (suID) |
|---|---|---|---|---|
| U1 | PW1 | FV1 | S1 | U1S1 |
| ... | ... | ... | ... | ... |

FIG. 11

AUTHENTICATION INFORMATION DATABASE

| USER ID (uID) | PASSWORD (PW) | FEATURE VALUES | SERVICE PROVIDER ID (spID) | SERVICE USER ID (suID) |
|---|---|---|---|---|
| ... | ... | ... | ... | ... |
| U1 | PW1 | FV1 | S1 | U1S1 |
| | | | S2 | U1S2 |
| U2 | PW2 | FV2 | S1 | U2S1 |

FIG. 13

| SERVICE REGISTRATION |
|---|

Enter the following information.

NAME: ☐

ADDRESS: ☐

⋮

If you wish to receive a service using face authentication, enter your ID and password that you have registered in the authentication center.

ID: ☐

PASSWORD: ☐

USER INFORMATION DATABASE

| PERSONAL INFORMATION | SERVICE USER ID (suID) |
|---|---|
| ... | ... |
| NAME, ADDRESS, ... | U1S1 |

<SERVICE REGISTRATION PHASE>

FIG. 20

AUTHENTICATION INFORMATION DATABASE

| USER ID (uID) | PASSWORD (PW) | FEATURE VALUES | SERVICE PROVIDER ID (spID) | SERVICE USER ID (suID) | ENCRYPTION KEY |
|---|---|---|---|---|---|
| ... | ... | ... | ... | ... | ... |
| U1 | PW1 | FV1 | S1 | U1S1 | K(U1S1) |
|  |  |  | S2 | U1S2 | K(U1S2) |
| U2 | PW2 | FV2 | S1 | U2S1 | K(U2S1) |

<SERVICE REGISTRATION PHASE>

<SERVICE PROVISION PHASE>

FIG. 23

USER INFORMATION DATABASE

| ENCRYPTION KEY | SERVICE USER ID (suID) |
|---|---|
| ... | ... |
| K(U1S1) | U1S1 |

FIG. 24

AUTHENTICATION INFORMATION DATABASE

| USER ID (uID) | PASSWORD (PW) | FEATURE VALUES | SERVICE PROVIDER ID (spID) | SERVICE USER ID (suID) | PERSONAL INFORMATION (ENCRYPTED TEXT) |
|---|---|---|---|---|---|
| ... | ... | ... | ... | ... | ... |
| U1 | PW1 | FV1 | S1 | U1S1 | Enc(U11) |
| | | | S2 | U1S2 | Enc(U12) |
| U2 | PW2 | FV2 | S1 | U2S1 | Enc(U21) |

AUTHENTICATION SERVER

AUTHENTICATION SERVER, AUTHENTICATION SYSTEM, CONTROL METHOD OF AUTHENTICATION SERVER, AND STORAGE MEDIUM

This application is a National Stage Entry of PCT/JP2020/016177 filed on Apr. 10, 2020, the contents of all of which are incorporated herein by reference, in their entirety.

TECHNICAL FIELD

The present invention relates to an authentication server, an authentication system, a control method of an authentication server, and a storage medium.

BACKGROUND ART

In recent years, various kinds of services using biological information have begun to spread. For example, face authentication is used for various kinds of procedures (check-in procedures, procedures at baggage drop-off counters, etc.) performed in airports and for check-in procedures at hotels, etc.

In the case of a service using face authentication, processing is performed as follows. First, a terminal (a terminal installed at an airport or a hotel) acquires a face image of a user and generates feature values (a feature vector) that characterize the face image. The generated feature values are transmitted to a server on a network.

The server includes a database that stores biological information and personal information (a name, an address, etc.) of the user who wishes to receive the service using face authentication. When the server acquires a matching request from the terminal, the server searches the above database (performs matching) and determines the biological information and the personal information corresponding to the matching request from the terminal. The server transmits the determined personal information to the terminal, and the terminal installed at the airport or the like performs an operation based on the acquired personal information.

For example, PTL 1 discloses a private lodging management server in a private lodging service system. This management server performs identification of a lodger by using an image of the guest captured by a mobile terminal and unlocks a room door.

CITATION LIST

Patent Literature

[PTL 1] Japanese Unexamined Patent Application Publication No. JP2018-101235

SUMMARY OF INVENTION

Technical Problem

FIG. 2 in PTL 1 illustrates a configuration in which the server that performs authentication based on biological information manages personal information in association with the biological information. This configuration could cause a serious problem if information is leaked from the database in the server. In particular, biological information of a person, such as a face image, a fingerprint image, and a vein pattern, does not change for his or her entire life. That is, biological information cannot be changed even if information leakage occurs. Leakage of a combination of such biological information and personal information to a third party could cause an irreversible situation.

As measures against the above information leakage, personal information or the like can be encrypted. However, if encrypted text and a key for decrypting the encrypted text are stored in the same server, the key and the encrypted text could be leaked simultaneously. Thus, encrypting personal information or the like is not an ultimate solution.

It is a main object of the present invention to provide an authentication server, an authentication system, a control method of an authentication server, and a storage medium that enable more secure authentication using biological information.

Solution to Problem

According to a first aspect of the present invention, there is provided an authentication server including: a user registration unit that acquires a first ID that uniquely determines a user in a system and first biological information that is used for authentication of the user; a service registration unit that processes a service registration request that is transmitted from a service provider of a service that the user wishes to use and that includes the first ID and a second ID that identifies the service provider; and a storage unit, wherein the service registration unit generates a third ID that is uniquely determined by a combination of the user and the service provider and transmits the third ID to the service provider, and wherein the storage unit stores the first biological information, the first ID, the second ID, and the third ID in association with each other.

According to a second aspect of the present invention, there is provided an authentication system including: an authentication server; and a management server, wherein the authentication server includes a user registration unit that acquires a first ID that uniquely determines a user in the system and first biological information that is used for authentication of the user, a service registration unit that processes a service registration request that is transmitted from a service provider of a service that the user wishes to use and that includes the first ID and a second ID that identifies the service provider, and a first storage unit, wherein the service registration unit generates a third ID that is uniquely determined by a combination of the user and the service provider and transmits the third ID to the service provider, wherein the first storage unit stores the first biological information, the first ID, the second ID, and the third ID in association with each other, and wherein the management server includes a personal information acquisition unit that acquires the first ID and personal information of the user from the user, a service registration request unit that acquires the third ID by transmitting the service registration request to the authentication server, and a second storage unit that stores personal information of the user and the third ID in association with each other.

According to a third aspect of the present invention, there is provided a control method of an authentication server, the control method including: acquiring a first ID that uniquely determines a user in a system and first biological information that is used for authentication of the user; receiving a service registration request that is transmitted from a service provider of a service that the user wishes to use and that includes the first ID and a second ID that identifies the service provider; generating a third ID that is uniquely determined by a combination of the user and the service provider; transmitting the third ID to the service provider;

and storing the first biological information, the first ID, the second ID, and the third ID in association with each other.

According to a fourth aspect of the present invention, there is provided a computer-readable storage medium storing a program causing a computer mounted on an authentication server to perform processing for: acquiring a first ID that uniquely determines a user in a system and first biological information that is used for authentication of the user; receiving a service registration request that is transmitted from a service provider of a service that the user wishes to use and that includes the first ID and a second ID that identifies the service provider; generating a third ID that is uniquely determined by a combination of the user and the service provider; transmitting the third ID to the service provider; and storing the first biological information, the first ID, the second ID, and the third ID in association with each other.

Advantageous Effects of Invention

The individual aspects of the present invention provide an authentication server, an authentication system, a control method of an authentication server, and a storage medium that enable more secure authentication using biological information. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 9 is a diagram illustrating an example of an authentication information database.

FIG. 10 is a diagram illustrating an example of the authentication information database.

FIG. 11 is a diagram illustrating an example of the authentication information database.

FIG. 13 is a diagram illustrating an operation of a personal information acquisition unit in the management server according to the first example embodiment.

FIG. 14 is a diagram illustrating an example of a user information database.

FIG. 20 is a diagram illustrating an example of an authentication information database.

FIG. 23 is a diagram illustrating an example of a user information database.

FIG. 24 is a diagram illustrating an example of an authentication information database.

EXAMPLE EMBODIMENT

Figure 1:
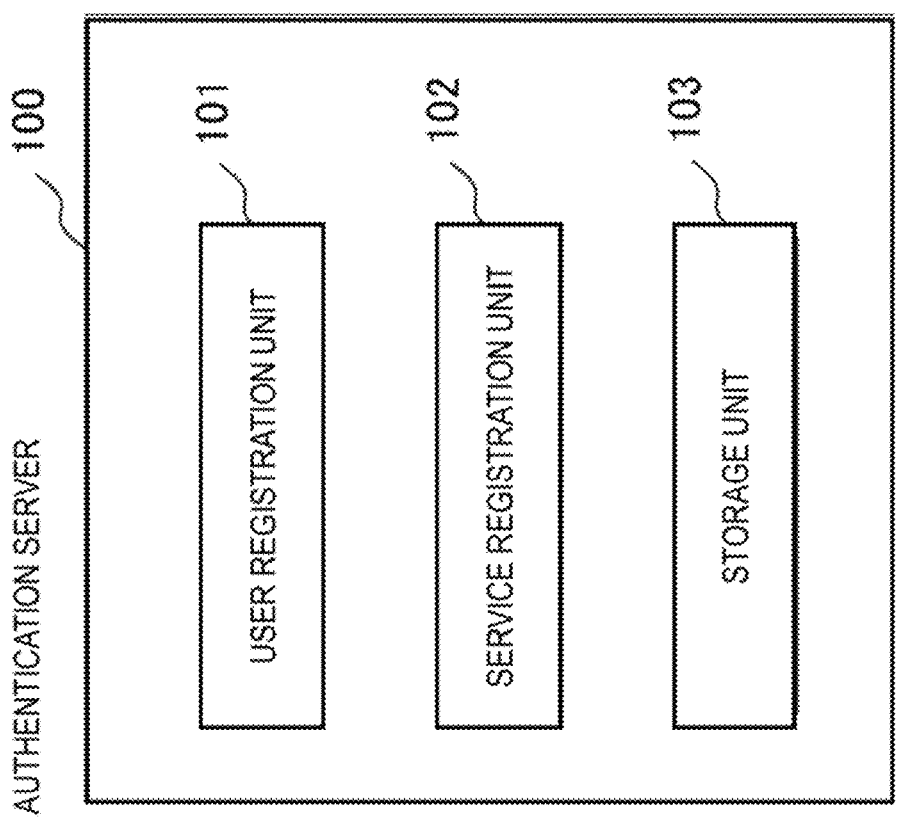
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

An authentication server 100 according to an example embodiment includes a user registration unit 101, a service registration unit 102, and a storage unit 103 (see FIG. 1). The user registration unit 101 acquires a first ID that uniquely determines a user in a system and first biological information that is used for authentication of the user. The service registration unit 102 processes a service registration request that is transmitted from a service provider of a service that the user wishes to use and that includes the first ID and a second ID that identifies the service provider. The service registration unit 102 generates a third ID uniquely determined by a combination of the user and the service provider and transmits the third ID to the service provider. The storage unit 103 stores the first biological information, the first ID, the second ID, and the third ID in association with each other.

While biological information of users and various kinds of IDs are stored in the storage unit 103 in the authentication server 100, personal information (for example, names, etc.) of the users are not stored in the storage unit 103. Thus, even if information is leaked from the authentication server 100, because no personal information associated with biological information is obtained by a third party, the participants (the system users and service providers) in the authentication system can use the authentication based on the authentication server 100 more securely. By storing the personal information of an individual user and a corresponding third ID in association with each other, the service provider can acquire personal information necessary for service provision from a third ID acquired from the authentication server 100.

Hereinafter, specific example embodiments will be described in more detail with reference to drawings.

First Example Embodiment

A first example embodiment will be described in more detail with reference to drawings.

System Configuration

Figure 2:
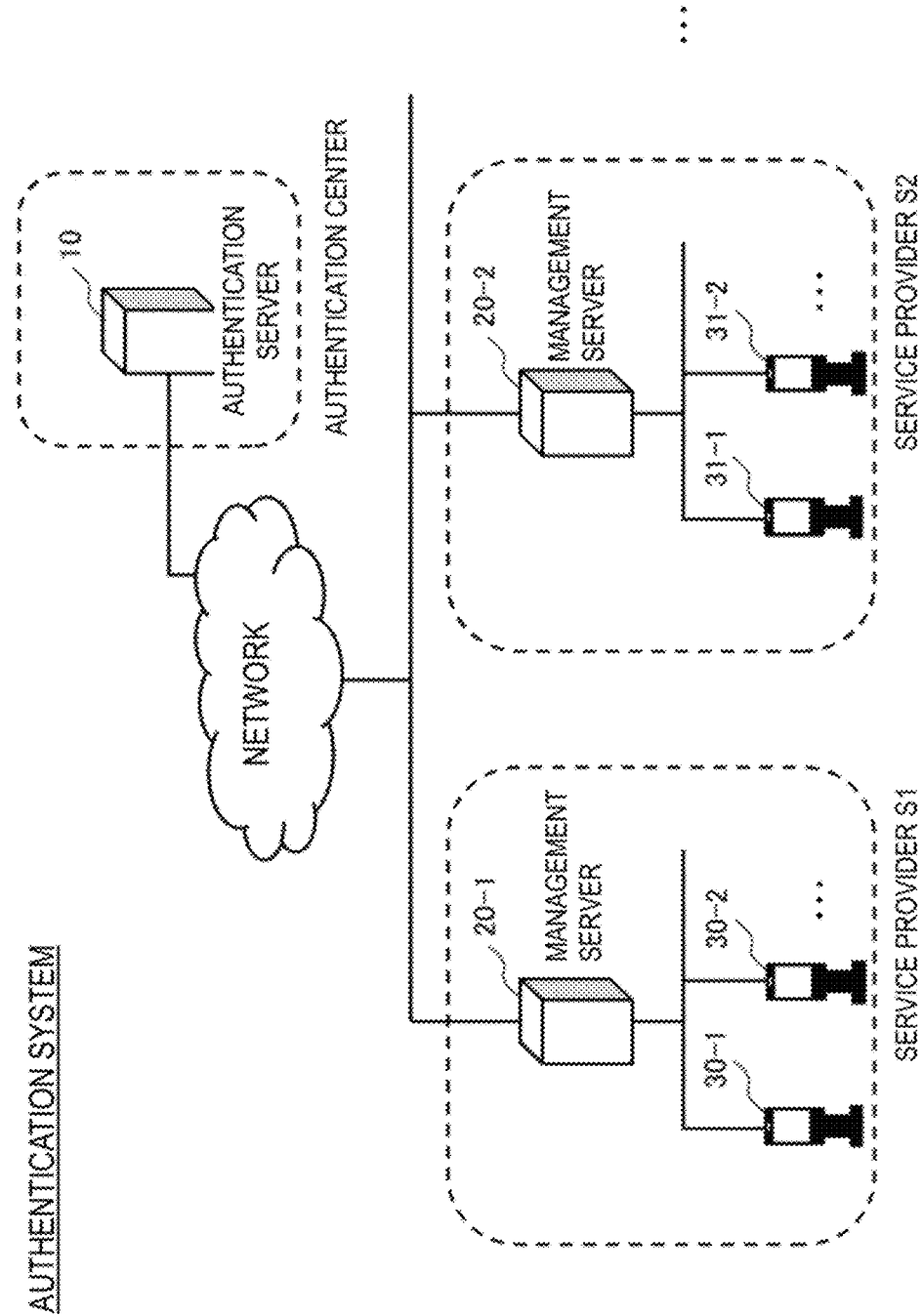
FIG. 2 is a diagram illustrating an example of a schematic configuration of an authentication system according to a first example embodiment.

FIG. 2 is a diagram illustrating an example of a schematic configuration of an authentication system according to a first example embodiment. As illustrated in FIG. 2, the authentication system includes an authentication center and a plurality of service providers.

Each service provider that participates in the authentication system provides a service using biological authentication. Examples of the services provided by the service providers include payment services at retail stores, etc. and accommodation services at hotels, etc. Examples of the services provided by the service providers also include emigration and immigration examination at airports and ports. The service providers disclosed in the present application may provide any services that can be provided by using biological authentication.

An authentication server 10 is installed in the authentication center. The authentication server 10 operates as an authentication station that performs authentication using biological information. The authentication server 10 may be a server installed on the premises of the authentication center or may be a server installed on a cloud.

Examples of the biological information of a user include data (feature values) calculated from physical features unique to this individual, such as a face, a fingerprint, a voiceprint, a vein, a retina, or an iris pattern of an eye of the user. Alternatively, the biological information of a user may be image data of a face image or a fingerprint image of the user, for example. The biological information of a user may be any information including physical features of the user.

The authentication server 10 is a server apparatus for realizing an individual service based on biological authentication. The authentication server 10 processes an "authentication request" transmitted from an individual service provider and transmits a corresponding result of the authentication processing to the service provider.

The individual service provider has a management server and an authentication terminal.

For example, a management server 20 and a plurality of authentication terminals 30 are installed at a service provider S1. A management server 20 and a plurality of authentication terminals 31 are installed at a service provider S2.

In the following description, when a certain component needs to be distinguished from the other components, a reference numeral on the right side of the corresponding hyphen will be used. As the apparatuses included in the service provider S1 operate in the same way as those included in the service provider S2, the following description will be made with a focus on the service provider S1.

The apparatuses illustrated in FIG. 2 are connected to each other. For example, the authentication server 10 and the individual management server 20 are each connected to wired or wireless communication means so that the authentication server 10 and the individual management server 20 can communicate with each other.

The individual management server 20 is a server that controls and manages overall operations of the corresponding service provider. For example, if a service provider is a retail store, the corresponding management server 20 performs merchandise inventory control, etc. If the service provider is a hotel operator, the corresponding management server 20 manages information about guest reservations, for example.

In addition to the above functions relating to the provision of a service, the individual management server 20 has control and management functions relating to biological authentication of the users.

The individual authentication terminal 30 is an apparatus that functions as an interface for the users who visit at the corresponding service provider. The users receive various services via the authentication terminal 30. For example, if the service provider is a retail store, a user performs payment by using the authentication terminal 30. If the service provider is a hotel operator, a user performs a check-in procedure by using the authentication terminal 30.

The configuration illustrated in FIG. 2 is an example and does not limit the configuration or the like of the authentication system disclosed in the present application. For example, two or more authentication servers 10 may be installed in the authentication center. At least one authentication terminal 30 is installed by the individual service provider. Alternatively, the functions of the management server 20 and the functions of the individual authentication terminal 30 may be integrated, and in this case, a single apparatus having the integrated functions may be installed to provide a service using biological authentication. At each service provider, a plurality of authentication terminals 30 may be connected to a single management server 20 as illustrated in FIG. 2 or a single authentication terminal 30 may alternatively be connected to a single management server 20.

[Schematic System Operation]

Next, a schematic operation in the authentication system according to the first example embodiment will be described.

The operation in the authentication system includes three phases.

The first phase is a phase (a user registration phase) in which a user performs system registration.

The second phase is a phase (a service registration phase) in which the user performs service registration.

The third phase is a phase (a service provision phase) in which a service using biological authentication is provided to the user.

[User Registration Phase]

Figure 3:
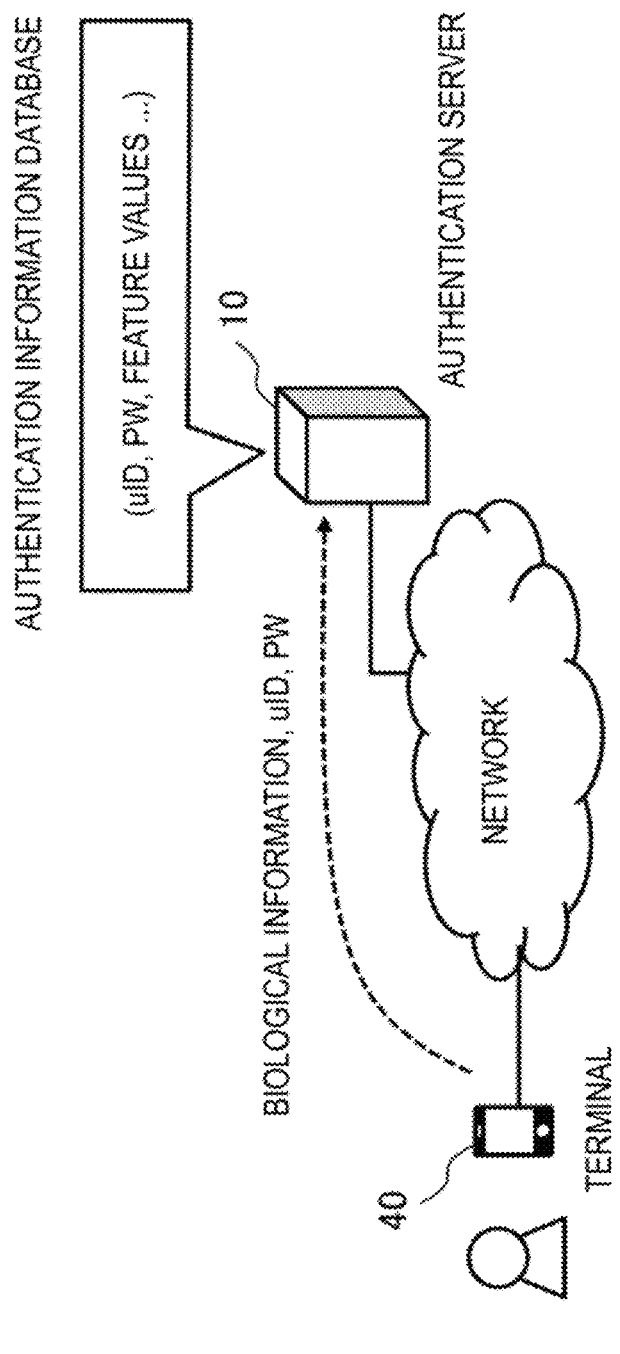
FIG. 3 is a diagram illustrating an operation in a user registration phase in the authentication system according to the first example embodiment.

FIG. 3 is a diagram illustrating an operation in the user registration phase in the authentication system according to the first example embodiment.

A user who wishes to receive a service using biological authentication performs user registration in advance. The user determines information (a user ID (Identifier) and a PW (password)) for determining himself or herself in the authentication system and registers the information in the system. In the drawings including FIG. 3, the user ID will be denoted as "uID".

In addition, the user registers his or her biological information (for example, a face image) in the system. The user registers the above three items of information (the user ID, the password, and the biological information) in the system by using any means. For example, the user may mail a document in which the above three items of information are written to the authentication center, and an employee at the authentication center may enter the above three items of information to the authentication server 10. Alternatively, the user may mail an external storage device such as a USB (Universal Serial Bus) memory in which the above three items of information are stored to the authentication center.

Alternatively, the user may enter his or her face image captured by operating his or her terminal 40, a user ID, and a password to the authentication server 10. Examples of the terminal 40 include a portable terminal device such as a smartphone, a portable phone, a game console, or a tablet and a computer (a personal computer or a laptop computer).

The authentication server 10 generates feature values (a feature vector formed by a plurality of feature values) from the acquired face image and stores the feature values, the user ID, and the password in association with each other. Specifically, the authentication server 10 adds a new entry in its authentication information database and stores the above three items of information in association with each other.

In this way, in the user registration phase, a first ID (for example, a user ID) that uniquely determines a user in the system and first biological information used for authentication of the user are registered in the system. In the first example embodiment, a user ID and a password are used as the identifier (the first ID) that uniquely determines a user in the system. However, if each user uses a unique user ID, the user ID may be used as the above identifier (the first ID).

[Service Registration Phase]

Figure 4:
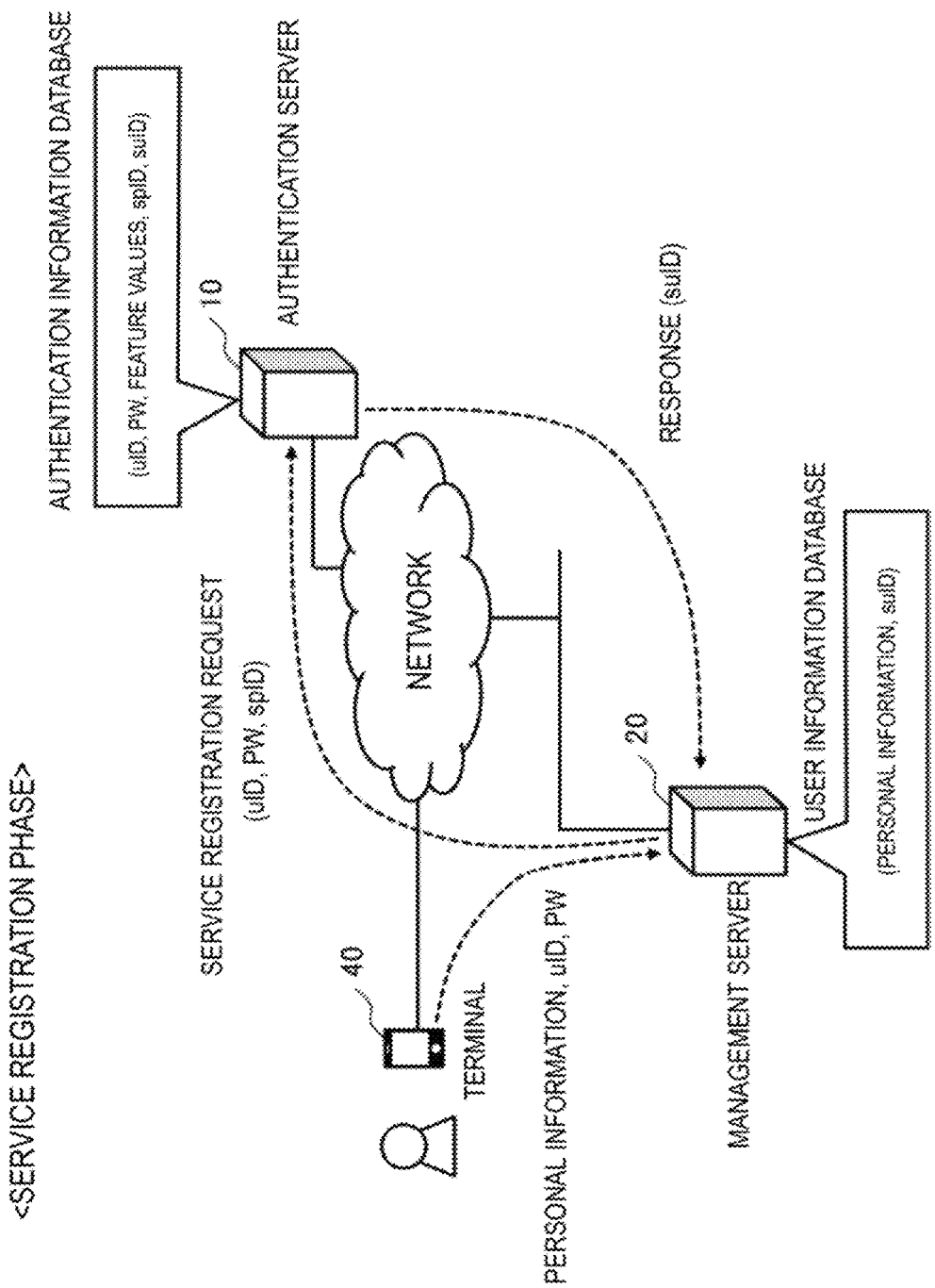
FIG. 4 is a diagram illustrating an operation in a service registration phase in the authentication system according to the first example embodiment.

FIG. 4 is a diagram illustrating an operation in the service registration phase in the authentication system according to the first example embodiment.

Upon completing the user registration, the user selects a service provider from which the user wishes to receive a service using biological authentication and registers the selected service provider in the system. For example, in FIG. 2, if the user wishes to receive a service from the service provider S1, the user registers the service provider S1 in the system.

The user registers personal information (for example, his or her name, etc.) necessary for receiving a service from the selected service provider in the system. Examples of the personal information include his or her name, age, and gender. In addition to the above personal information, the user registers the user ID and the password determined in the user registration phase in the system.

In the disclosure of the present application, the personal information is defined as information that does not include biological information of the user (the authentication target user). That is, biological information and feature values generated from the biological information are excluded from "personal information" in the disclosure of the present application.

The user enters the above three items of information (the personal information, the user ID, and the password) to the selected service provider by using any means. For example, the user mails a medium (a paper medium, an electronic medium) in which the above three items of information are written to the selected service provider. An employee of the service provider enters the above three items of information to the corresponding management server 20. The user may enter the above three items of information to the corresponding management server 20 by operating an authentication terminal 30 installed at the service provider.

Alternatively, as illustrated in FIG. 4, the user enters the above three items of information to the management server 20 by operating his or her terminal 40. In this case, the user enters the above three items of information on a web page managed and operated by the service provider.

After the management server 20 acquires the above three items of information (the personal information, the user ID, and the password), the management server 20 transmits a "service registration request" to the authentication server 10. Specifically, the management server 20 transmits a service registration request including a service provider ID, the user ID, and the password to the authentication server 10.

The service provider ID is identification information for uniquely identifying the service provider (for example, a retail store participating in the authentication infrastructure using biological authentication) included in the authentication system. In the example in FIG. 2, a different service provider ID is assigned to each of the service providers S1 and S2.

An individual service provider ID is an ID assigned to each service provider, not to each service. For example, in FIG. 2, even if the service providers S1 and S2 provide the same kind of service (for example, an accommodation service), if the service providers S1 and S2 are different business operators, different IDs are assigned to these service providers.

The authentication server 10 and the management server 20 share the service provider ID by using any method. For example, when a service provider participates in the authentication infrastructure, the authentication server 10 can generate a service provider ID and distribute (transmit) the generated service provider ID to the service provider. In the drawings including FIG. 4, the service provider ID will be denoted as "spID".

Upon receiving the service registration request, the authentication server 10 searches its authentication information database by using the user ID and the password included in the request as a key and determines the corresponding user. Thereafter, the authentication server 10 generates a "service user ID".

The service user ID is identification information that uniquely identifies the correspondence relationship between (a combination of) the user and the service provider. For example, in the example in FIG. 2, a value that is set as a service user ID defined by a combination of a user U1 and the service provider S1 and a value that is set as a service user ID defined by a combination of the user U1 and the service provider S2 are different values.

The authentication server 10 stores the user ID, the password, the feature values, the service provider ID, and the above-generated service user ID in association with each other. In the drawings including FIG. 4, the service user ID will be denoted as "suID".

The authentication server 10 transmits the above-generated service user ID to the management server 20 that has transmitted the service registration request. The authentication server 10 gives the service user ID to the management server 20 by transmitting a response including the service user ID to the management server 20.

The management server 20 stores the service user ID acquired from the authentication server 10 and the personal information of the user in association with each other. The management server 20 adds a new entry in a user information database and stores the above information (the personal information and the service user ID).

The user repeats the registration operation as described above for each service provider from which the user wishes to receive a service using biological authentication. In other words, the user does not perform the registration operation for service providers from which the user does not wish to receive services.

As described above, in the service registration phase, the service provider of a service that the user wishes to use transmits a service registration request including a first ID (for example, the user ID) and a second ID (for example, the service provider ID) to the authentication server 10. When processing the service registration request, the authentication server 10 generates a third ID (for example, the service user ID) uniquely determined by a combination of the user and the service provider. The authentication server 10 transmits the third ID to the service provider. The service provider (the management server 20) stores the personal information of the user and the third ID in association with each other.

[Service Provision Phase]

Figure 5:
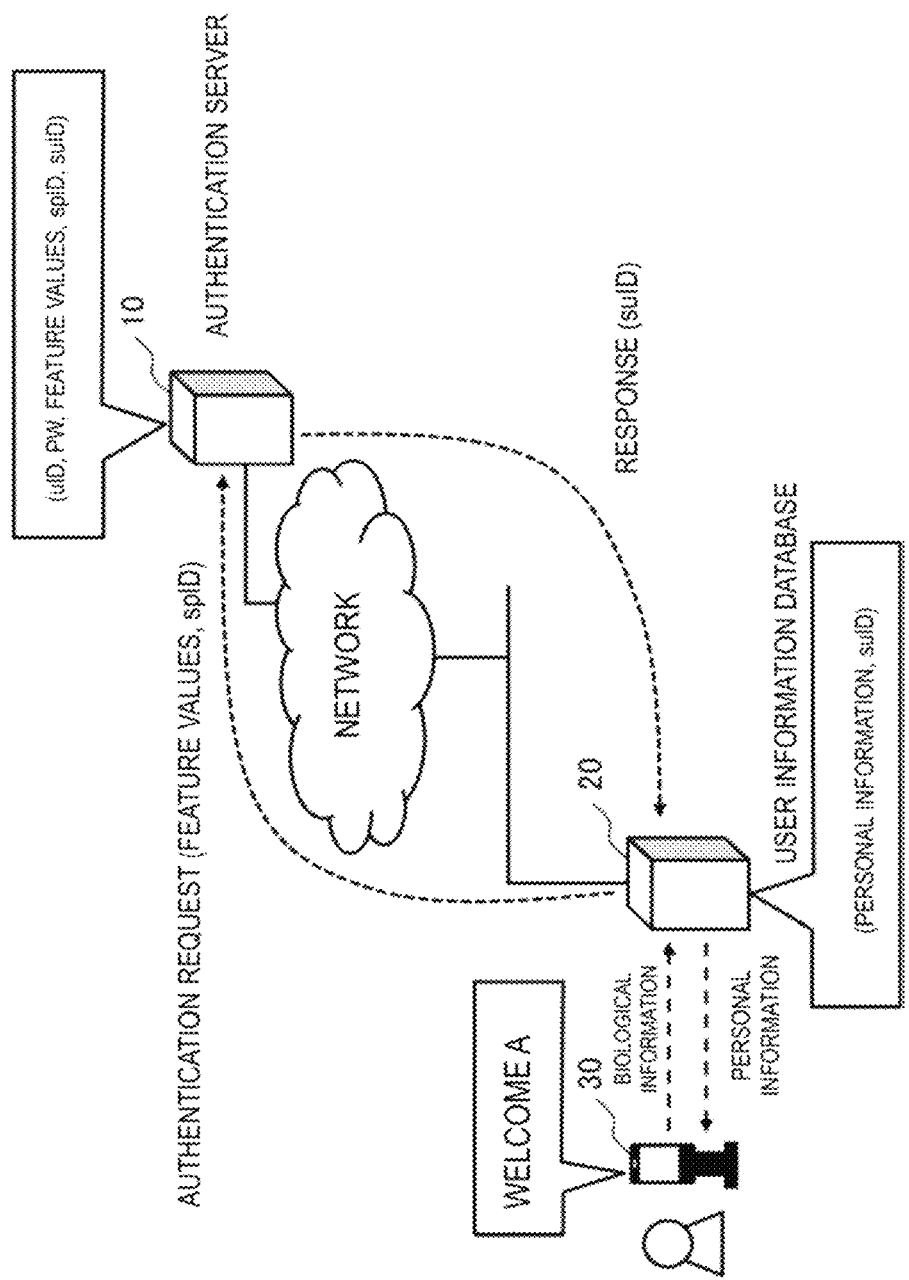
FIG. 5 is a diagram illustrating an operation in a service provision phase in the authentication system according to the first example embodiment.

FIG. 5 is a diagram illustrating an operation in the service provision phase in the authentication system according to the first example embodiment.

Upon completion of the registration of a service (the service registration phase), the user visits the corresponding service provider. The user stands in front of an authentication terminal 30.

The authentication terminal 30 acquires biological information from the user standing in front of the authentication terminal 30. Specifically, the authentication terminal 30 captures an image of the user and acquires a face image. The authentication terminal 30 transmits the acquired face image to the management server 20.

The management server 20 generates feature values from the acquired face image. The management server 20 transmits an authentication request including the generated feature values and its service provider ID to the authentication server 10.

The authentication server 10 extracts the feature values from the authentication request and performs matching processing (1-to-N processing; N will hereinafter denote a positive integer) by using the extracted feature values and the feature values registered in the authentication information database.

The authentication server 10 determines the user by performing the matching processing and determines the service user ID corresponding to the service provider ID included in the authentication request among the plurality of service user IDs associated with the determined user.

The authentication server 10 transmits the determined service user ID to the management server 20 that has transmitted the authentication request. The authentication server 10 transmits a response including the determined service user ID (a response to the authentication request) to the management server 20.

The management server 20 searches its user information database by using the acquired service user ID as a key and determines the personal information corresponding to the service user ID. The service provider (the management server 20, the authentication terminal 30) provides the user with a service based on the determined personal information (for example, a payment procedure, a check-in procedure, etc.).

As described above, in the service provision phase, the authentication server 10 receives an authentication request including second biological information of a user and a second ID (a service provider ID) from a service provider. The authentication server 10 determines a third ID (a service user ID) by using the first and second biological information and the second ID. The authentication server 10 transmits the determined third ID to the service provider. When providing a service to the user, the management server 20 determines the personal information of the user by using the third ID acquired by transmitting the authentication request to the authentication server 10. The service provider provides a service to the user by using the determined personal information.

Next, details of the individual apparatuses included in the authentication system according to the first example embodiment will be described.

[Authentication Server]

Figure 6:
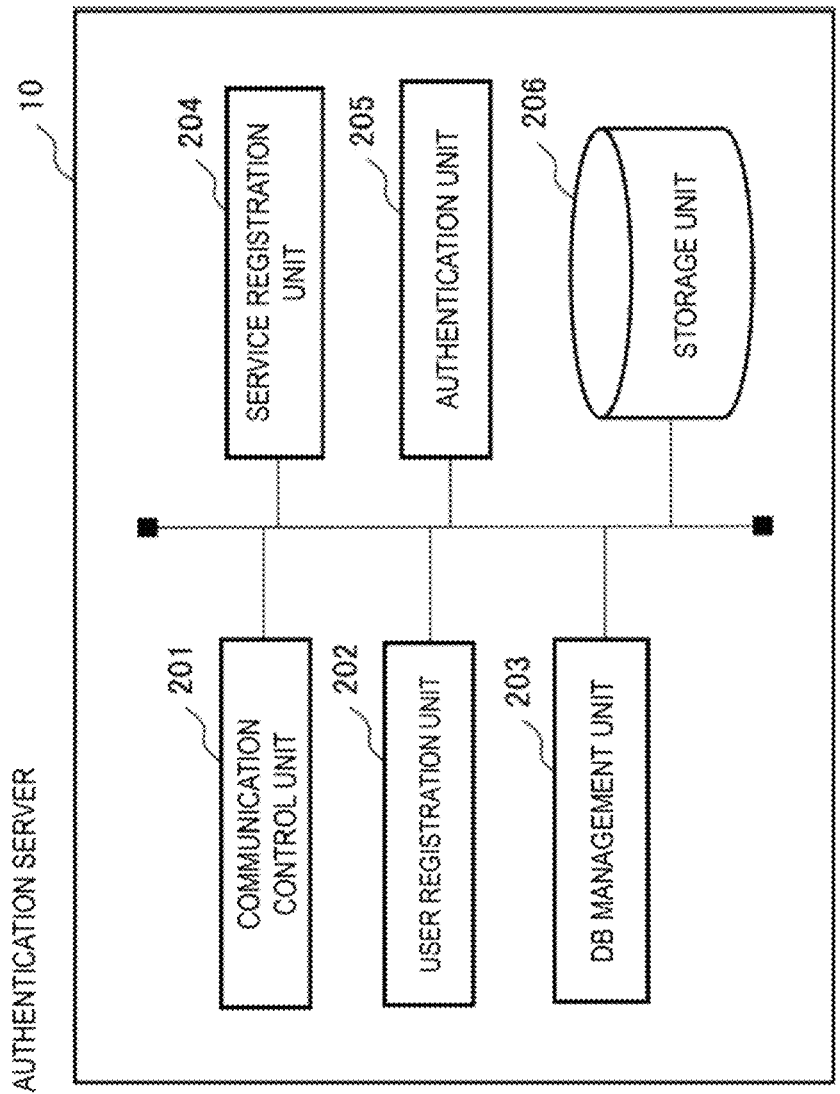
FIG. 6 is a diagram illustrating an example of a processing configuration of an authentication server according to the first example embodiment.

FIG. 6 is a diagram illustrating an example of a processing configuration (processing modules) of the authentication server 10 according to the first example embodiment. As illustrated in FIG. 6, the authentication server 10 includes a communication control unit 201, a user registration unit 202, a database management unit 203, a service registration unit 204, an authentication unit 205, and a storage unit 206.

The communication control unit 201 is means for controlling communication with other apparatuses. Specifically, the communication control unit 201 receives data (packets) from the management servers 20. In addition, the communication control unit 201 transmits data to the management servers 20. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit 201.

The user registration unit 202 is means for realizing the above user registration. The user registration unit 202 acquires the user ID, the password, and the biological information (a face image) of a user (a user who wishes to receive a service using biological authentication; a system user).

The user registration unit 202 acquires the above three items of information (the user ID, the password, and the biological information) by using any means. For example, the user registration unit 202 displays a GUI (Graphical User Interface) or an input form on which the user ID and the password are determined on a terminal 40. For example, the user registration unit 202 displays a GUI as illustrated in FIG. 7 on the terminal 40.

The user registration unit 202 determines whether the user ID and password acquired on the GUI or the like have already been registered. If the user ID and password have not been registered yet, the user registration unit 202 displays a GUI for acquiring biological information of the user on the terminal 40.

Figure 8:
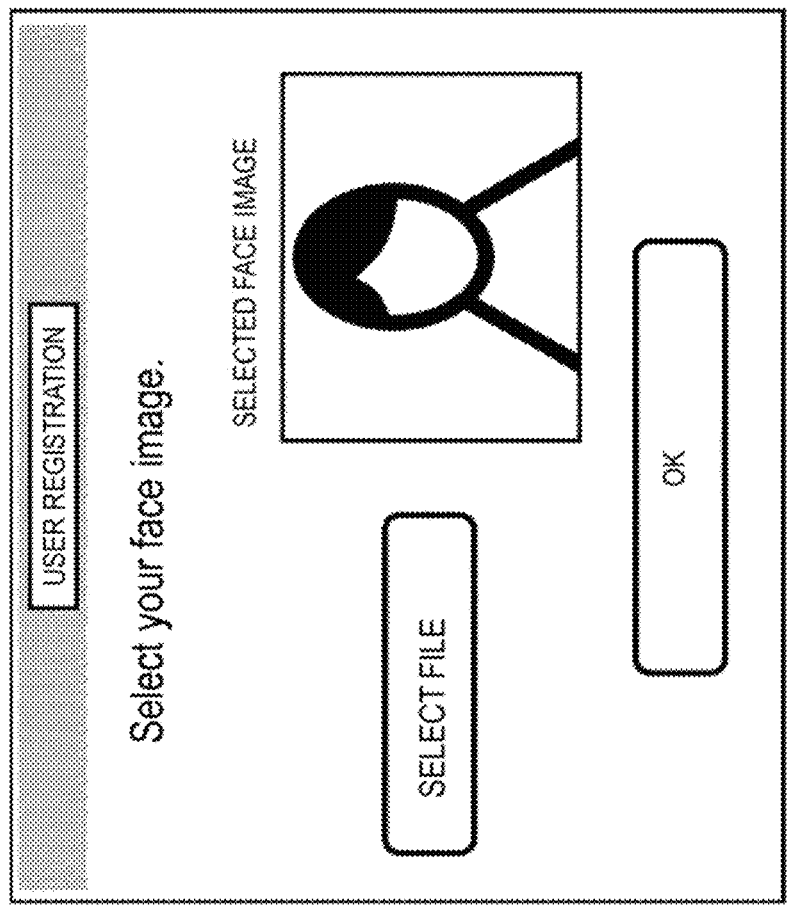
FIG. 8 is a diagram illustrating an operation of the user registration unit in the authentication server according to the first example embodiment.

For example, the user registration unit 202 displays a GUI as illustrated in FIG. 8 on the terminal 40. For example, the user presses a "Select File" button illustrated in FIG. 8 and specifies the image data of a face image to be registered in the system. The specified face image is displayed on a preview area (displayed as "Selected Face Image" in FIG. 8). To register a previewed face image, the user presses the "OK" button.

Figure 7:
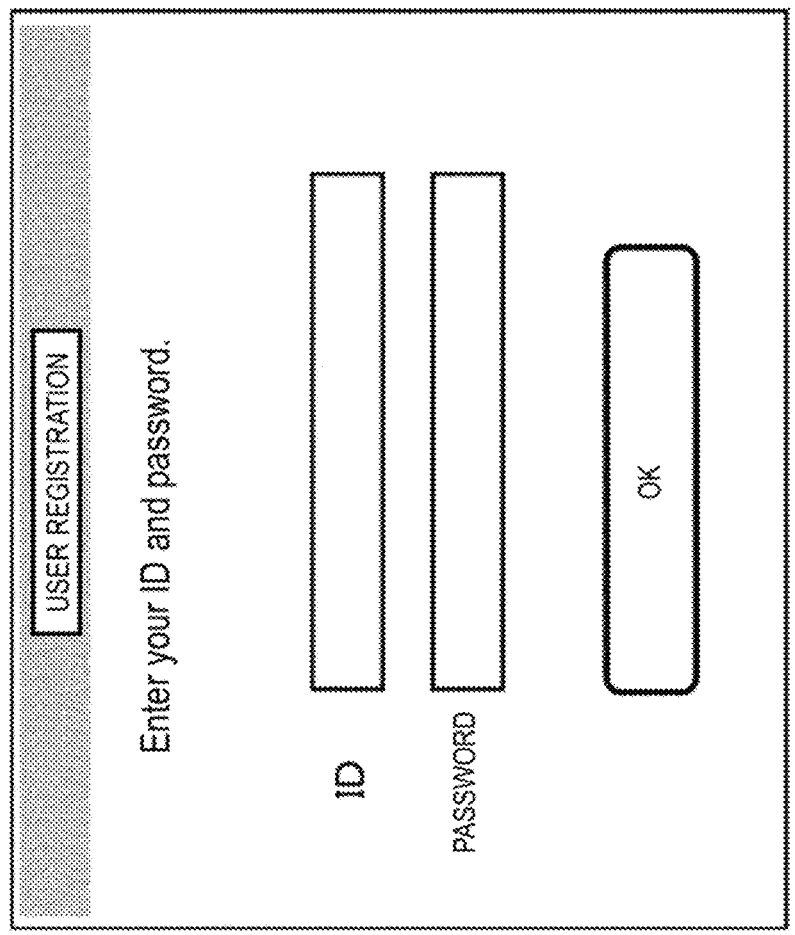
FIG. 7 is a diagram illustrating an operation of a user registration unit in the authentication server according to the first example embodiment.

For example, the user registration unit 202 acquires the user ID, the password, and the biological information (a face image) on the GUIs as illustrated in FIG. 7 and FIG. 8 and generates feature values (a feature vector formed by a plurality of feature values) from the face image.

Specifically, the user registration unit 202 extracts feature points from the acquired face image. An existing technique can be used to extract the feature points, and therefore, detailed description thereof will be omitted. For example, the user registration unit 202 extracts the eyes, nose, mouth, etc. from the face image as the feature points. Next, the user registration unit 202 calculates the location of an individual feature point and the distance between feature points as feature values and generates a feature vector formed by the plurality of feature values (vector information that characterizes the face image).

The user registration unit 202 gives the user ID, the password, and the feature values generated as described above to the database management unit 203.

The database management unit 203 is means for managing the authentication information database. The authentication information database stores information (a user ID and a password) that determines a system user, biological information (feature values) of the user, a service provider ID that determines a service provider, and a service user ID that determines the user in a corresponding service in association with each other.

When the database management unit 203 acquires the above three items of information (the user ID, the password, and the feature values) from the user registration unit 202, the database management unit 203 adds a new entry in the authentication information database. For example, when the database management unit 203 acquires the above three items of information about the user U1, the database management unit 203 adds an entry illustrated in the lowest row in FIG. 9. At the time of the user registration, since the service provider ID and the service user ID have not been generated yet, no information is set in these fields.

The service registration unit 204 is means for allowing a system user to register an individual service. The service registration unit 204 processes a service registration request acquired from the management server 20 of a service provider.

The service registration unit 204 searches the authentication information database by using the user ID and the password included in an acquired service registration request as a key. The service registration unit 204 checks the service provider ID field corresponding to the determined user (the user determined from a combination of the user ID and the password).

The service registration unit 204 determines whether the service provider ID included in the service registration request acquired from the management server 20 is set in the service provider ID field. If the service provider ID acquired from the management server 20 is already registered in the database, the service registration unit 204 notifies the management server 20 to that effect. In this case, since the service (the service provider) that the user wishes to register is already registered in the authentication information database, the service registration unit 204 transmits a "negative response" as a response to the service registration request.

In contrast, if the service provider ID included in the service registration request is not set in the service provider ID field corresponding to the determined user, the service registration unit 204 generates a service user ID corresponding to the user and the service provider.

As described above, a service user ID is identification information uniquely determined from a combination of a user and a service provider. For example, the service registration unit 204 calculates a hash value by using a user ID, a password, and a service provider ID and uses the calculated hash value as a service user ID. Specifically, the service registration unit 204 calculates a combined value of a user ID, a password, and a service provider ID, calculates a hash value of the combined value calculated, and uses the hash value as a service user ID.

The above generation of a service user ID by using a hash value is only an example. The method for generating a service user ID is not limited to the above generation method. A service user ID may be any information that can uniquely identify a combination of a system user and a service provider. For example, each time the service registration unit 204 processes a service registration request, the service registration unit 204 may generate a unique number and use this unique number as a service user ID.

After generating a service user ID, the service registration unit 204 gives the user ID, the password, the service provider ID, and the service user ID to the database management unit 203. The database management unit 203 registers the two IDs (the service provider ID and the service user ID) in the authentication information database. For example, if the user U1 registers a service of the service provider S1, the above two IDs are added in an entry illustrated in the lowest row in FIG. 10.

Since the service registration is performed per service provider, there are cases in which a plurality of service providers and a plurality of service user IDs are set for a single user. For example, if the user U1 registers a service of the service provider S1 and a service of the service provider S2, the entries in the second row and the third row in FIG. 11 are generated. If the user U2 registers a service of the service provider S1, an entry in the lowest row in FIG. 11 is generated.

The authentication information database illustrated in FIG. 11, etc. is an example. The information stored in the authentication information database is not limited to the information illustrated in FIG. 11, etc. For example, in place of feature values for authentication, a face image may be registered in the authentication information database. That is, at each authentication, feature values may be generated from a face image registered in the authentication information database.

When a service provider ID and a service user ID are registered in the authentication information database, the service registration unit 204 notifies the management server 20 that the service registration request has been processed successfully. The service registration unit 204 transmits a "positive response" as a response to the service registration request. Specifically, the service registration unit 204 transmits a response including the service user ID to the management server 20.

The authentication unit 205 is means for performing authentication processing for system users. The authentication unit 205 processes the authentication requests received from the management servers 20 of the service providers.

The authentication unit 205 extracts the feature values and the service provider ID from an authentication request. The authentication unit 205 searches the authentication information database by using the extracted feature values and service provider ID as a key and determines a corresponding service user ID.

The authentication unit 205 performs 1-to-N matching by setting the feature values extracted from an authentication request as the matching target feature values and by setting the feature values stored in the database as the registered feature values. Specifically, the authentication unit 205 calculates the similarity between a set of matching target feature values and each of a plurality of sets of registered feature values. For the individual similarity, the chi-squared distance, the Euclidean distance, or the like may be used. A longer distance represents a lower similarity, and a shorter distance represents a higher similarity.

The authentication unit 205 determines whether, among the plurality of sets of feature values registered in the database, there is at least one set of feature values whose similarity to the set of matching target feature values is a predetermined value or more. Next, if the authentication unit 205 finds a plurality of sets of feature values whose similarity to the set of matching target feature values is a predetermined value or more, the authentication unit 205 determines a set of feature values whose similarity is the highest among the plurality of sets of feature values. If the authentication unit 205 finds such set of feature values, the authentication unit 205 determines whether there is an entry matching the service provider ID included in the authentication request among the at least one service provider ID associated with the user, the at least one service provider ID having been determined by the above 1-to-N matching.

If there is an entry as described above (if the authentication unit 205 succeeds in the above two determination operations), the authentication unit 205 determines that the authentication of the user has succeeded. Specifically, the authentication unit 205 transmits a "positive response" to the management server 20 that has transmitted the authentication request. In this case, the authentication unit 205 generates a response including the service user ID in the determined entry (a response to the authentication request) and transmits the response to the management server 20.

If at least one of the above two determination operations fails, the authentication unit 205 determines that the authentication of the user has failed. In this case, the authentication unit 205 transmits a "negative response" to the management server 20 that has transmitted the authentication request.

For example, in the example in FIG. 11, if feature values "FV1" and a service provider ID "S1" are included in an authentication request, the entries (a user) in the second and third rows are first determined by the feature values FV1, and the entry in the second row is next determined by the service provider ID "S1". As a result, the above authentication request is processed successfully, and a positive response including a service user ID "U1S1" is transmitted to the management server 20.

In contrast, if feature values "FV2" and a service provider ID "S2" are included in an authentication request, the entry in the lowest row is determined by the feature values. However, since the service provider ID in the entry indicates "S1", not "S2", the above authentication request is not processed successfully. As a result, a negative response is transmitted to the management server 20.

The storage unit 206 stores information necessary for operations of the authentication server 10. The authentication information database is established in the storage unit 206.

[Management Server]

Figure 12:
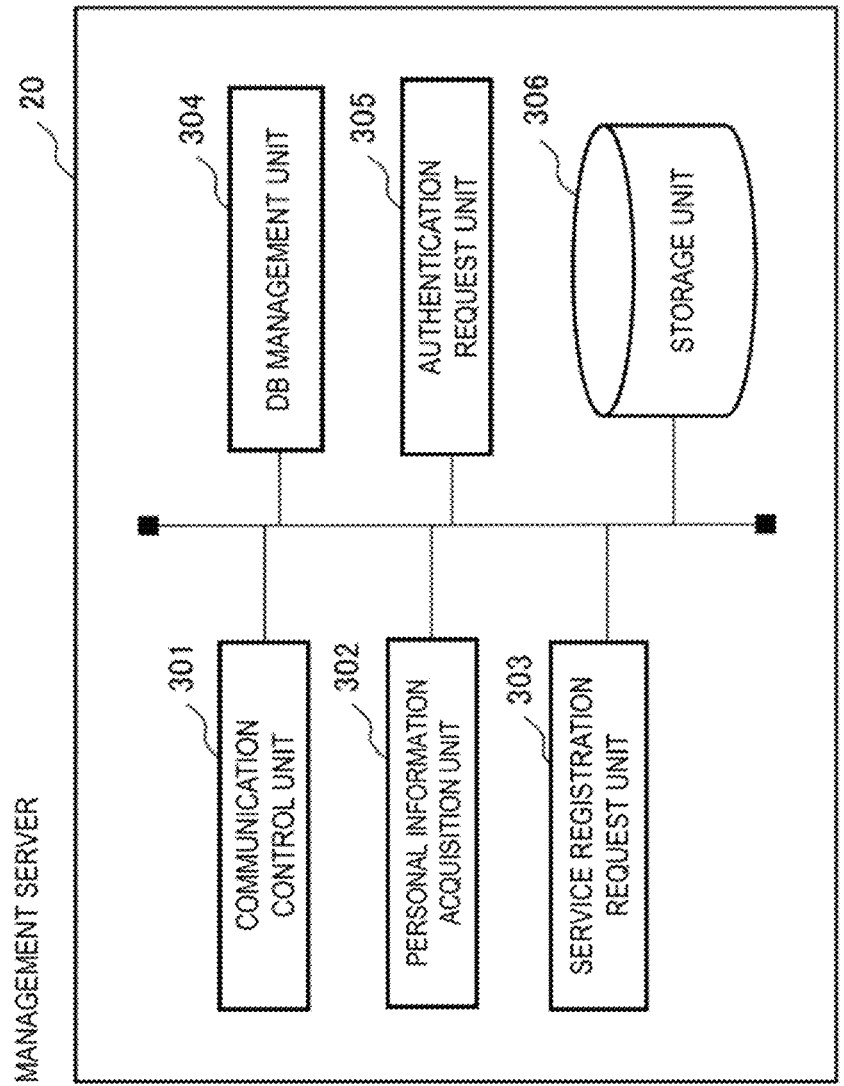
FIG. 12 is a diagram illustrating an example of a processing configuration of a management server according to the first example embodiment.

FIG. 12 is a diagram illustrating an example of a processing configuration (processing modules) of a management server 20 according to the first example embodiment. As illustrated in FIG. 12, the management server 20 includes a communication control unit 301, a personal information acquisition unit 302, a service registration request unit 303, a database management unit 304, an authentication request unit 305, and a storage unit 306.

The communication control unit 301 is means for controlling communication with other apparatuses. Specifically, the communication control unit 301 receives data (packets) from the authentication server 10 and the corresponding authentication terminals 30. In addition, the communication control unit 301 transmits data to the authentication server 10 and the corresponding authentication terminals 30. The communication control unit 301 gives data received from other apparatuses to other processing modules. The communication control unit 301 transmits data acquired from other processing modules to other apparatuses. In this way, other processing modules transmit and receive data to and from other apparatuses via the communication control unit 301.

The personal information acquisition unit 302 is means for acquiring personal information needed when the corresponding service provider provides a service. For example, when the service provider is a "retail store", the personal information acquisition unit 302 acquires, in addition to the name of a user, etc., information about payment (for example, credit card information or bank account information). When the service provider is a "hotel operator", the personal information acquisition unit 302 acquires, in addition to the name, etc., reservation information about accommodation (for example, accommodation date, etc.).

The personal information acquisition unit 302 acquires, in addition to the above personal information such as the name, the user ID and the password that the user has determined at the time of the system registration.

The personal information acquisition unit 302 acquires the personal information, the user ID, and the password by using any means. For example, the personal information acquisition unit 302 displays a GUI or a form for entering the above information on a terminal 40 (see FIG. 13). Alternatively, information as illustrated in FIG. 13 may be displayed on a web page managed and operated by the corresponding service provider. Alternatively, a terminal 40 may download an application provided by the service provider, and the application may display a GUI or a form as illustrated in FIG. 13. In particular, the web page may be a web page for managing information about the members of the service provider. That is, the members of an individual service provider may perform service registration on a web page for managing information about themselves.

The personal information acquisition unit 302 gives the personal information, the user ID, and the password acquired by using a GUI or the like to the service registration request unit 303.

The service registration request unit 303 is means for requesting (asking) the authentication server 10 to register a service to be used by a user.

The service registration request unit 303 selects the user ID and the password from the above three items of information (the personal information, the user ID, and the password) acquired from the personal information acquisition unit 302. The service registration request unit 303 transmits a service registration request including the selected user ID and password and the corresponding service provider ID to the authentication server 10.

The service registration request unit 303 acquires a response to the service registration request from the authentication server 10. If the acquired response is a "negative response", the service registration request unit 303 notifies the user to that effect. For example, the service registration request unit 303 notifies the user that the service registration has already been performed.

If the acquired response is a "positive response", the service registration request unit 303 notifies the user that the service registration has succeeded. In addition, the service registration request unit 303 gives the service user ID included in the response and the personal information acquired from the personal information acquisition unit 302 to the database management unit 304.

The database management unit 304 is means for managing the user information database. The user information database is a database for managing information about the service provision target users (the system users). The user information database stores personal information (for example, the name, etc.) of an individual user and an individual service user ID acquired from the authentication server 10 in association with each other.

Upon acquiring the above information (the personal information and the service user ID) from the service registration request unit 303, the database management unit 304 adds a new entry in the user information database. For example, when the management server 20 of the service provider S1 acquires the above information about the user U1, an entry illustrated in the lowest row in FIG. 14 is added.

The authentication request unit 305 is means for requesting the authentication server 10 to perform the authentication of the user.

Upon acquiring biological information (a face image) from a corresponding authentication terminal 30, the authentication request unit 305 generates feature values from the face image. The authentication request unit 305 transmits an authentication request including the generated feature values and the corresponding service provider ID to the authentication server 10.

If the response from the authentication server 10 is a "negative response" (if the authentication fails), the authentication request unit 305 notifies the authentication terminal 30 to that effect.

If the response from the authentication server 10 is a "positive response" (if the authentication succeeds), the authentication request unit 305 extracts the service user ID included in the response transmitted from the authentication server 10. The authentication request unit 305 searches the user information database by using the service user ID as a key and determines a corresponding entry.

The authentication request unit 305 reads out the personal information set in the personal information field of the determined entry and transmits the personal information to the authentication terminal 30. For example, in the example in FIG. 14, if the service user ID is "U1S1", the personal information in the lowest row is transmitted to the authentication terminal 30.

The storage unit 306 stores information necessary for operations of the management server 20. The user information database is established in the storage unit 306.

[Authentication Terminal]

An authentication terminal 30 acquires personal information of a user from the corresponding management server 20 by transmitting biological information acquired from the user to the management server 20. The authentication terminal 30 provides a service to the user by using the acquired personal information.

Figure 15:
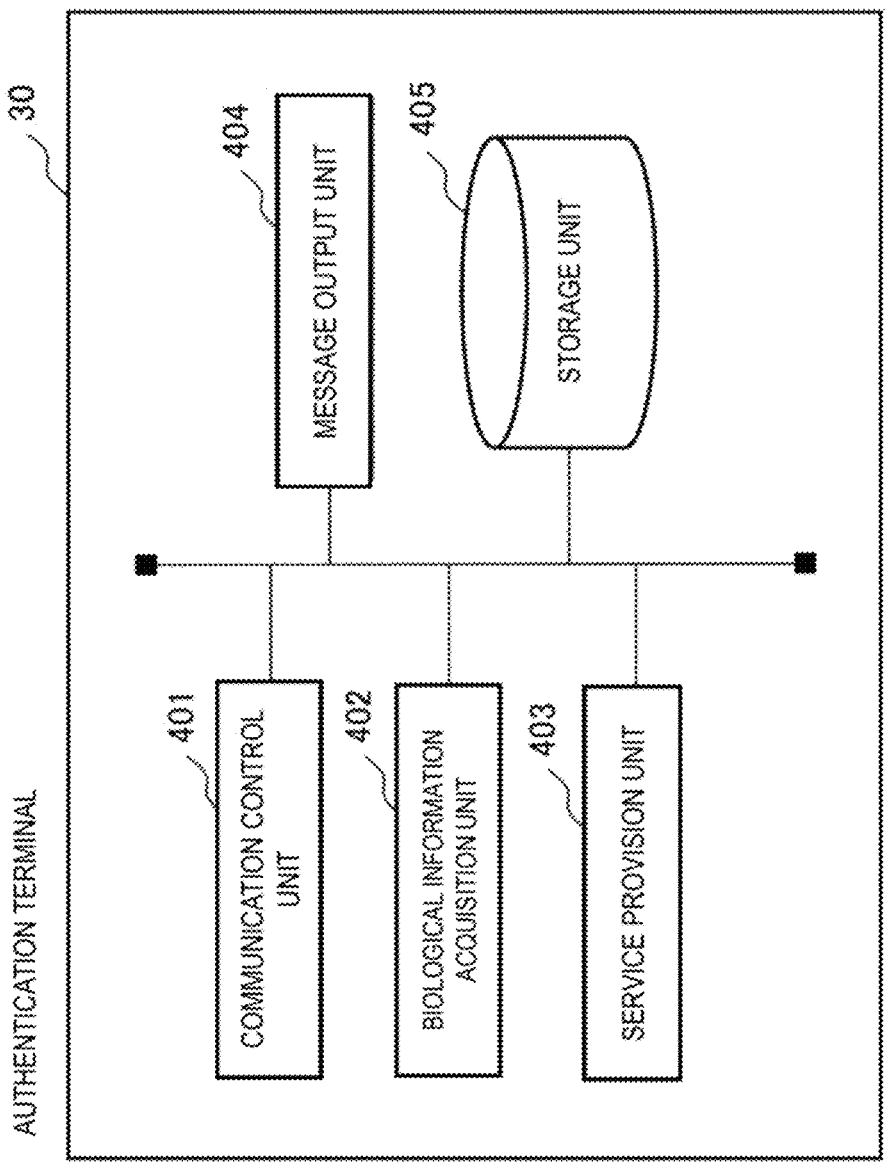
FIG. 15 is a diagram illustrating an example of a processing configuration of an authentication terminal according to the first example embodiment.

FIG. 15 is a diagram illustrating an example of a processing configuration (processing modules) of an authentication terminal 30 according to the first example embodiment. As illustrated in FIG. 15, the authentication terminal 30 includes a communication control unit 401, a biological information acquisition unit 402, a service provision unit 403, a message output unit 404, and a storage unit 405.

The communication control unit 401 is means for controlling communication with other apparatuses. Specifically, the communication control unit 401 receives data (packets) from the corresponding management server 20. In addition, the communication control unit 401 transmits data to the corresponding management server 20. The communication control unit 401 gives data received from other apparatuses to other processing modules. The communication control unit 401 transmits data acquired from other processing modules to other apparatuses. In this way, other processing modules transmit and receive data to and from other apparatuses via the communication control unit 401.

The biological information acquisition unit 402 is means for acquiring biological information (a face image) of a user by controlling a camera. The biological information acquisition unit 402 captures an image of a person in front of the authentication terminal 30 regularly or at predetermined timing. The biological information acquisition unit 402 determines whether a face image of the person is included in the acquired image. If a face image is included in the acquired image, the face image is extracted from the acquired image data.

An existing technique can be used for the face image detection and extraction processing performed by the biological information acquisition unit 402, and therefore, detailed description thereof will be omitted. For example, the biological information acquisition unit 402 may extract a face image (a face area) from the image data by using a learning model learned by a CNN (Convolutional Neural Network).

Alternatively, the biological information acquisition unit 402 may extract a face image by using a technique such as template matching.

The biological information acquisition unit 402 gives the extracted face image to the service provision unit 403.

The service provision unit 403 is means for providing a predetermined service to the user. The service provision unit 403 transmits a face image acquired from the biological information acquisition unit 402 to the management server 20. The management server 20 transmits, as a reply, personal information (for example, the name, etc.) corresponding to the face image. The service provision unit 403 provides a service to the user by using the personal information transmitted as a reply.

The message output unit 404 is means for outputting various messages to the user. For example, the message output unit 404 outputs a message relating to a user authentication result and a message relating to a service to be provided. The message output unit 404 may display a message by using a display device such as a liquid crystal monitor or plays an audio message by using an audio device such as a speaker.

The storage unit 405 stores information necessary for operations of the authentication terminal 30.

[System Operation]

Next, operations in the authentication system according to the first example embodiment will be described. Hereinafter, while operations in the service registration phase and the service provision phase will be described, an operation in the user registration phase will be omitted.

Figure 16:
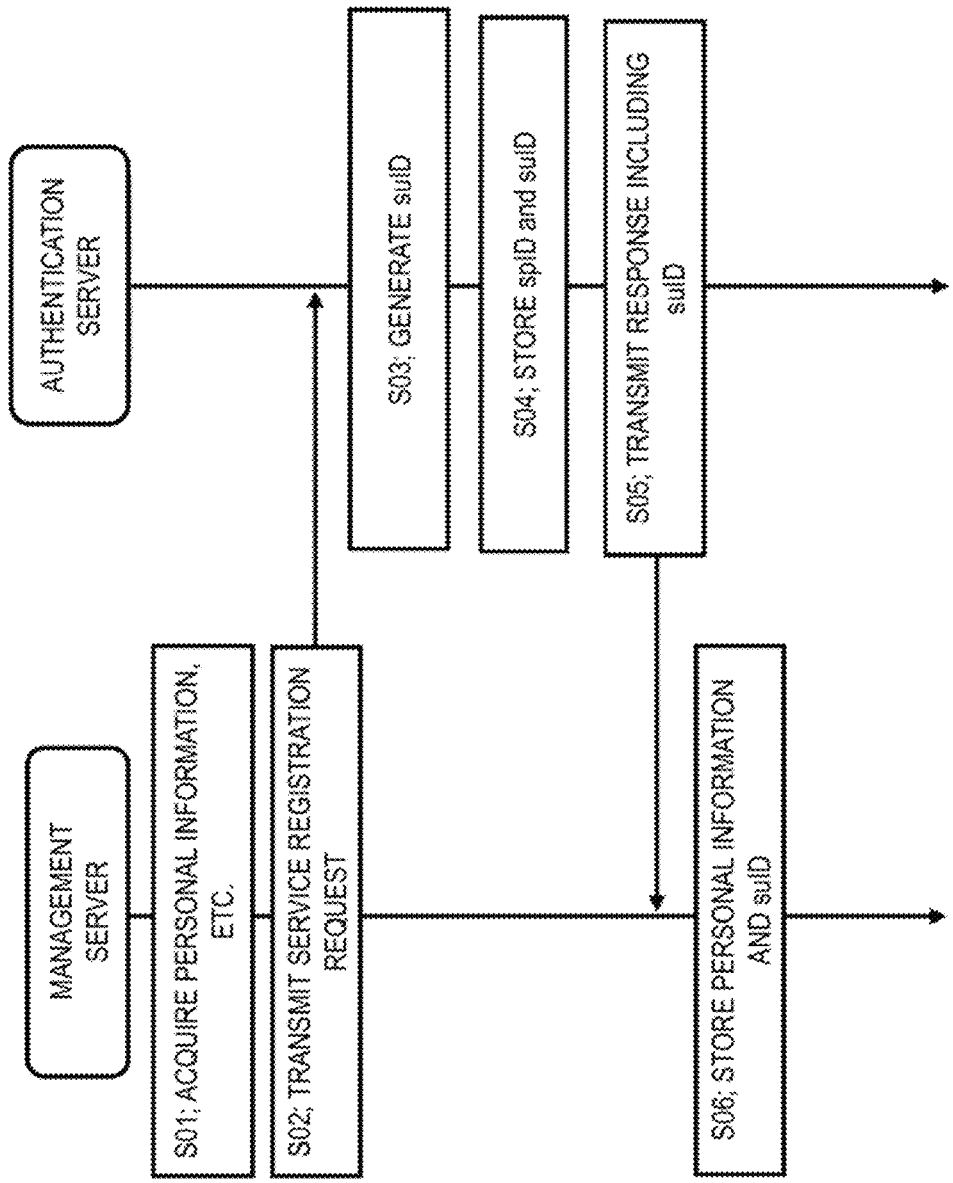
FIG. 16 is a sequence diagram illustrating an example of an operation relating to the service registration phase in the authentication system according to the first example embodiment.

FIG. 16 is a sequence diagram illustrating an example of an operation relating to the service registration phase in the authentication system according to the first example embodiment.

A management server 20 acquires personal information (information necessary for providing a service), a user ID, and a password from a user (step S01).

The management server 20 transmits a service registration request including the acquired user ID and password and its service provider ID to the authentication server 10 (step S02).

The authentication server 10 generates a service user ID by using the acquired user ID, password, and service provider ID (step S03).

The authentication server 10 stores the service provider ID and the service user ID in its authentication information database (step S04).

The authentication server 10 transmits a response including the service user ID (a response to the service registration request) to the management server 20 (step S05).

The management server 20 stores the personal information acquired in step S01 and the service user ID acquired from the authentication server 10 in association with each other in its user information database (step S06).

Figure 17:
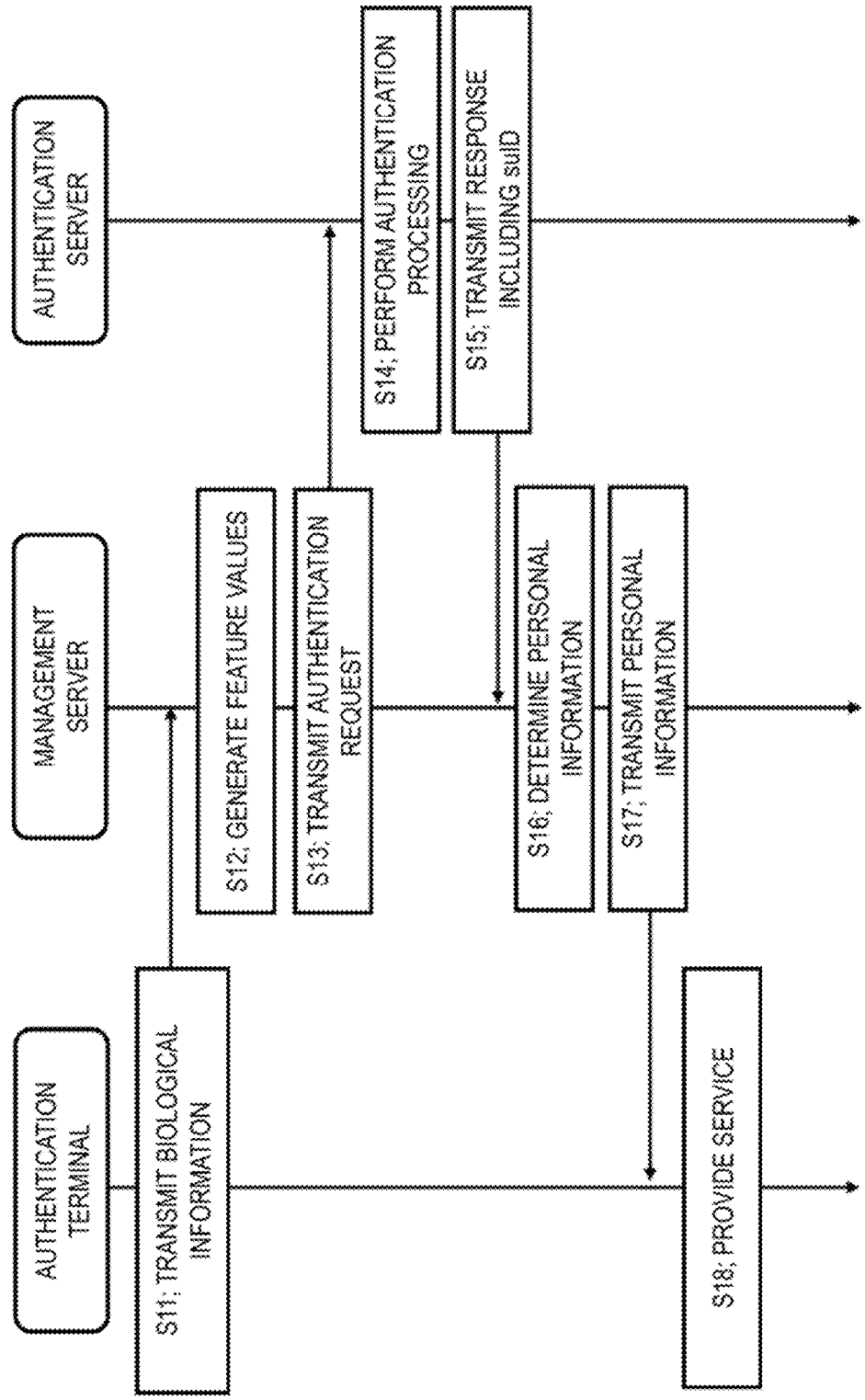
FIG. 17 is a sequence diagram illustrating an example of an operation relating to the service provision phase in the authentication system according to the first example embodiment.

FIG. 17 is a sequence diagram illustrating an example of an operation relating to the service provision phase in the authentication system according to the first example embodiment. Since the service registration phase has already been completed at the time of the service provision phase, the authentication server 10 already holds, as the first biological information, the first feature values generated from a face image of the user.

An authentication terminal 30 acquires a face image (biological information) of the user and transmits the acquired face image to the management server 20 (step S11).

The management server 20 generates feature values (second feature values) from the acquired face image (step S12). The management server 20 handles the generated feature values as the second biological information.

The management server 20 transmits an authentication request including the generated feature values and its service provider ID to the authentication server 10 (step S13).

The authentication server 10 performs authentication processing by using the feature values and the service provider ID included in the authentication request and determines the corresponding service user ID (step S14).

The authentication server 10 transmits a response including the determined service user ID (a response to the authentication request) to the management server 20 (step S15).

The management server 20 searches its user information database by using the acquired service user ID and determines the corresponding personal information (step S16).

The management server 20 transmits the determined personal information to the authentication terminal 30 (step S17).

The authentication terminal 30 provides a service by using the acquired personal information (step S18).

As described above, in the authentication system according to the first example embodiment, while the biological information about the user is stored in the authentication server 10, the biological information is not stored in the service provider. In addition, while the personal information about the user is stored in the management server 20 managed and operated by the service provider, the personal information is not stored in the authentication server 10. In the authentication system according to the first example embodiment, the above items of information are stored at separate locations. Thus, the authentication system provides an authentication infrastructure that is robust against information leakage. That is, biological information (in particular, feature values) not associated with personal information is only a series of numerical values and is not valuable to criminals, etc. Thus, even if information is leaked from the authentication server 10, the impact is limited. With the configuration as described above, the participants in the authentication system (the users receiving services and the service providers providing these services) can securely use the authentication system.

Second Example Embodiment

Next, a second example embodiment will be described in detail with reference to drawings.

In the first example embodiment, biological information used for the authentication of a user is stored in the authentication center, and personal information needed when the user uses a service is stored in a service provider. With this configuration, an authentication system highly resistant to information leakage (robust against information leakage) is established.

However, with the configuration according to the first example embodiment, there is still a possibility that the personal information is leaked from the service provider. In the second example embodiment, an authentication system highly resistant to information leakage from the service provider will be described.

As the authentication system according to the second example embodiment can have the same configuration as that according to the first example embodiment, the description corresponding to FIG. 2 will be omitted. In addition, as the authentication server 10, the individual management server 20, and the individual authentication terminal 30 according to the second example embodiment can have the same processing configurations as those according to first example embodiment, the description thereof will be omitted.

The following description will be made with a focus on the difference between the first and second example embodiments.

The authentication system according to the second example embodiment differs from the authentication system according to the first example embodiment in the operations in the service registration phase and the service provision phase.

Figure 18:
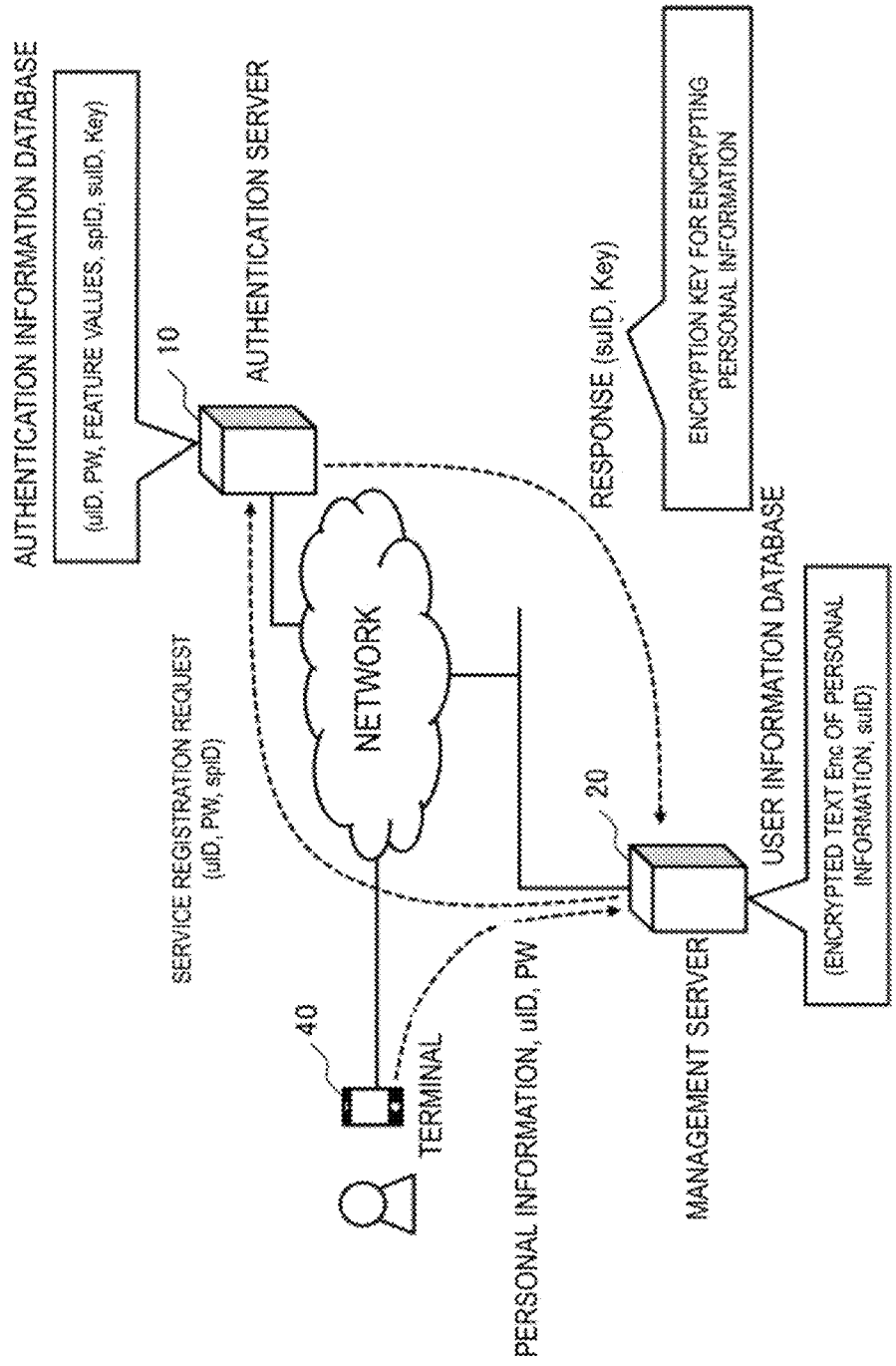
FIG. 18 is a diagram illustrating an operation in a service registration phase in an authentication system according to a second example embodiment.

A schematic operation in the service registration phase according to the second example embodiment will be described with reference to FIG. 18. Upon receiving a service registration request from a management server 20, the authentication server 10 generates an encryption key. The generated encryption key is associated with the corresponding user ID, password, service provider ID, and service user ID, and the associated data is stored in the authentication information database. The authentication server 10 transmits the generated encryption key and the service user ID to the management server 20. The management server 20 generates encrypted text Enc of the corresponding personal information acquired from the user by using the acquired encryption key and stores the encrypted personal information and the service user ID in association with each other. The management server 20 deletes the personal information in plain text.

Figure 19:
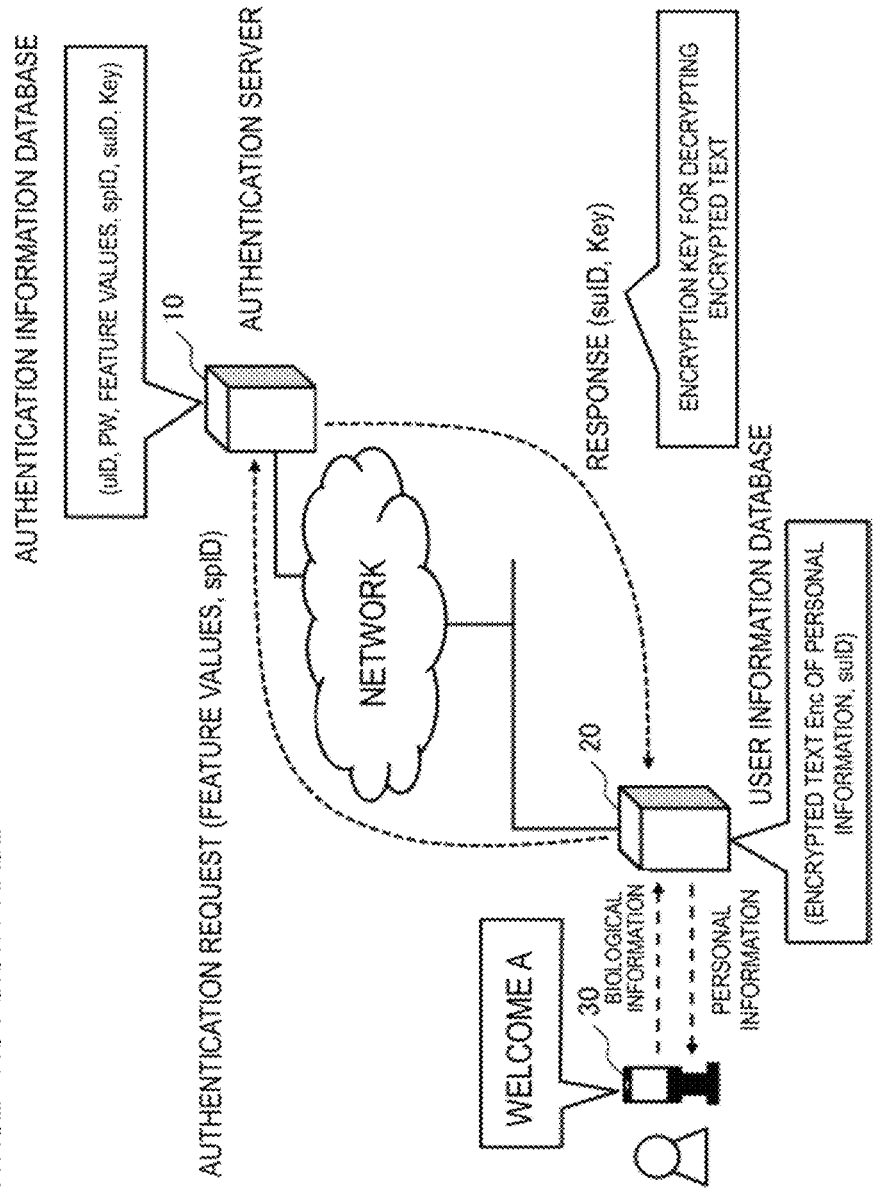
FIG. 19 is a diagram illustrating an operation in a service provision phase in the authentication system according to the second example embodiment.

A schematic operation in the service provision phase according to the second example embodiment will be described with reference to FIG. 19. Upon receiving an authentication request from a management server 20, the authentication server 10 searches its authentication information database and determines the corresponding service user ID and encryption key. The authentication server 10 transmits a response including the determined service user ID and encryption key (a response to the authentication request) to the management server 20. The management server 20 searches its user information database by using the acquired service user ID as a key and determines the corresponding personal information (encrypted personal information). The management server 20 decrypts the encrypted personal information by using the encryption key acquired from the authentication server 10. The management server 20 transmits the corresponding personal information in plain text to a corresponding authentication terminal 30. The authentication terminal 30 provides a service by using the personal information.

Next, detailed operations of the authentication server 10 and the individual management server 20 according to the second example embodiment will be described.

When the service registration unit 204 in the authentication server 10 receives a service registration request (a request including a user ID, a password, and a service provider ID) from a management server 20, the service registration unit 204 generates an encryption key. The encryption key is a key for encrypting the personal information entered by the user to the corresponding service provider and for decrypting the encrypted personal information. The service registration unit 204 generates an encryption key for an individual pair of a user and a service provider.

For example, the service registration unit 204 generates a common key, which is a key that enables both encryption and decryption. For example, the service registration unit 204 calculates a hash value, which is a value obtained by combining a user ID, a password, and a service provider ID. The service registration unit 204 generates a common key by using the calculated hash value as a "seed".

The user ID and the password are each a value unique to each user, and the service provider ID is a value unique to each service provider. Thus, a hash value (a seed for generating a key) calculated from a combined value of these values is a value unique to a combination of a user and a service provider. An encryption key calculated from a "seed", which is generated for each combination of a user and a service provider, is also a value unique to each combination of a user and a service provider.

The service registration unit 204 gives the generated encryption key, etc. to the database management unit 203.

The database management unit 203 updates the authentication information database by using the acquired encryption key. For example, the authentication information database according to the second example embodiment includes an encryption key field as illustrated in FIG. 20.

As illustrated in FIG. 20, an encryption key K(U1S1) is generated for a combination of the user U1 and the service provider S1, and an encryption key K(U1S2) is generated for a combination of the user U1 and the service provider S2.

The service registration unit 204 transmits a response including the service user ID and the encryption key generated in response to the service registration request to the management server 20 that has transmitted the service registration request.

The service registration request unit 303 in the management server 20 receives the response to the service registration request. The service registration request unit 303 extracts the encryption key from the response and encrypts the personal information (for example, the name, etc.) of the user. The service registration request unit 303 gives the encrypted personal information and the service user ID to the database management unit 304. Next, the service registration request unit 303 deletes the original personal information (the personal information in plain text) and the encryption key.

The database management unit 304 adds an entry including the encrypted personal information and the service user ID in the user information database. The user information database stores the encrypted personal information and the service user ID (a third ID) in association with each other.

When the authentication unit 205 of the authentication server 10 receives an authentication request (an authentication request including the feature values of a user and a service provider ID) from a management server 20, the authentication unit 205 performs authentication processing by using these items of information. If the authentication succeeds, the service user ID and an encryption key that correspond to the combination of the user and the service provider are determined.

The authentication unit 205 transmits a response including the determined service user ID and encryption key (a response to the authentication request) to the management server 20.

The authentication request unit 305 of the management server 20 searches the user information database by using the acquired service user ID as a key and acquires the corresponding personal information (encrypted personal information).

The authentication request unit 305 decrypts the encrypted personal information by using the encryption key (common key) acquired from the authentication server 10. The authentication request unit 305 transmits the personal information in plain text to the authentication terminal 30. If the authentication request unit 305 succeeds in decrypting the personal information, the authentication request unit 305 deletes (discards) the encryption key acquired from the authentication server 10.

It is desirable that the authentication terminal 30 delete the personal information in plain text after providing a service to the user.

As described above, the authentication server 10 according to the second example embodiment generates an encryption key in response to a service registration request and transmits the generated encryption key and service user ID (third ID) to the corresponding management server 20. The management server 20 encrypts the personal information of the user by using the acquired encryption key and stores the encrypted personal information and the service user ID in association with each other. In addition, the authentication server 10 receives an authentication request including biological information of a user and a service provider ID (second ID) from a service provider. The authentication server 10 determines a service user ID (third ID) and an encryption key by using the two items of biological information and a service provider ID. The authentication server 10 transmits the determined service user ID and encryption key to the corresponding service provider. When the corresponding management server 20 provides a service to the user, the management server 20 determines the encrypted personal information by using the service user ID acquired by transmitting an authentication request to the authentication server 10. In addition, the management server 20 decrypts the encrypted personal information by using the encryption key acquired from the authentication server 10. The service is provided by using the decrypted personal information.

As described above, according to the second example embodiment, the personal information held by the individual service provider is encrypted. Even if the encrypted personal information is leaked, not a serious problem is caused. This is because security and privacy problems occur when the encrypted personal information is decrypted and the content thereof is acquired by a third party. The encryption keys to decrypt the encrypted personal information are stored in the authentication server 10, and each time a service is provided to a user, an encryption key is transmitted from the authentication server 10 to the corresponding service provider. As the authentication system according to the second example embodiment is configured in this way, it is hard to assume a situation in which information leakage from a management server 20 and information leakage from the authentication server 10 occur simultaneously (during the same period of time). Thus, even if encrypted personal information is leaked, if the encryption key is protected by the authentication center, this information leakage will not be a serious problem. In addition, since the management server 20 deletes the encryption key after the personal information is decrypted, the service provider itself cannot access the personal information. Therefore, the employees, etc. of the service provider are prevented from improperly acquiring the personal information, for example.

Third Example Embodiment

Next, a third example embodiment will be described in detail with reference to drawings.

According to the second example embodiment, a service provider encrypts personal information, and the authentication server 10 holds an encryption key for decrypting the encrypted text. According to the second example embodiment, since the encrypted text and the encryption key are separately stored, an authentication system highly resistant to leakage of the personal information can be provided. However, for example, improvement in information processing technology could break the encryption of encrypted text leaked from a management server 20. That is, it is not desirable for even encrypted personal information to be leaked from a service provider.

According to a third example embodiment, the authentication server 10 holds encrypted personal information, and the management servers 20 hold the corresponding encryption keys. In this way, an authentication system highly resistant to leakage of personal information can be provided.

As the authentication system according to the third example embodiment can have the same configuration as that according to the first example embodiment, the description corresponding to FIG. 2 will be omitted. In addition, as the authentication server 10, the management servers 20, and the authentication terminals 30 according to the third example embodiment can have the same processing configurations as those according to the first example embodiment, description thereof will be omitted.

Hereinafter, the third example embodiment will be described with a focus on the difference from the first and second example embodiments.

The authentication system according to the third example embodiment differs from those according to the first and second example embodiments in the operations in the service registration phase and the service provision phase.

Figure 21:
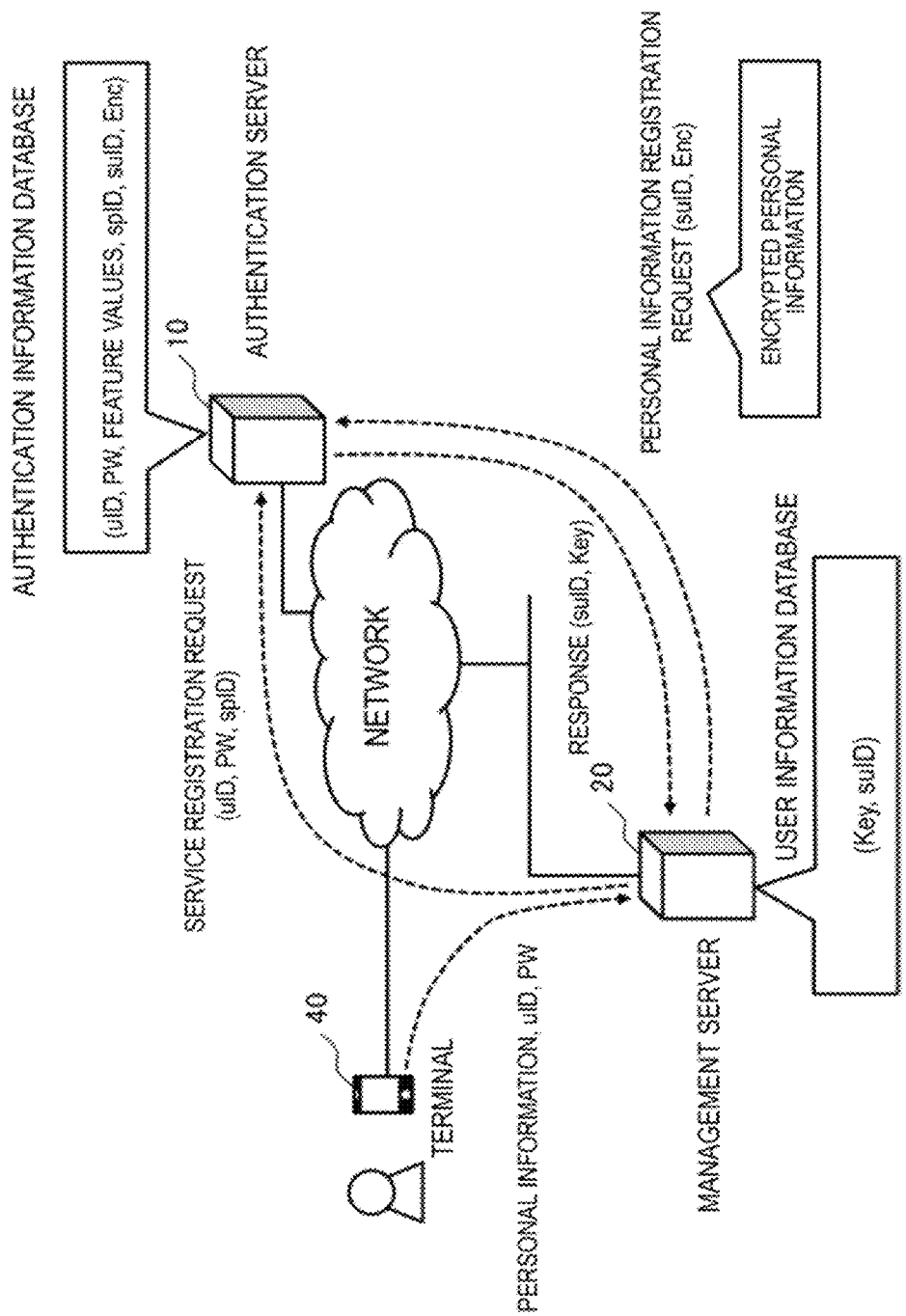
FIG. 21 is a diagram illustrating an operation in a service registration phase in an authentication system according to a third example embodiment.

A schematic operation in the service registration phase according to the third example embodiment will be described with reference to FIG. 21. The authentication server 10 generates an encryption key for encrypting personal information of a user. The generated encryption key is transmitted to a management server 20, along with a service user ID. The management server 20 generates encrypted text of the personal information by using the acquired encryption key and transmits a personal information registration request including the generated encrypted text (encrypted text Enc illustrated in FIG. 21) and the service user ID to the authentication server 10. The authentication server 10 searches its authentication information database by using the service user ID as a key and determines a corresponding entry. The authentication server 10 stores the encrypted personal information in the determined entry. After transmitting the personal information registration request, the management server 20 deletes the personal information in plain text. In addition, the management server 20 stores the encryption key and the service user ID acquired from the authentication server 10 in association with each other in its user database.

Figure 22:
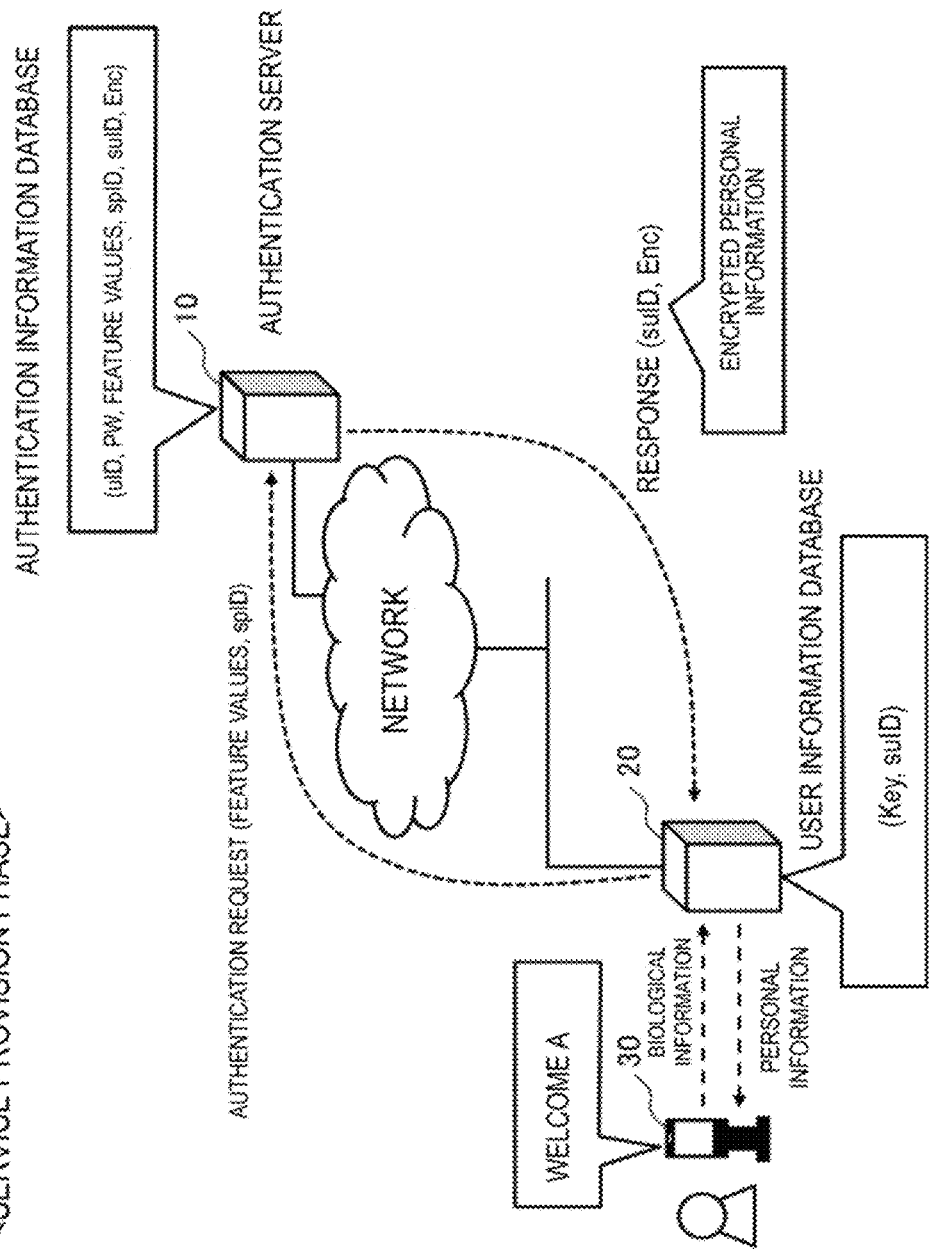
FIG. 22 is a diagram illustrating an operation in a service provision phase in the authentication system according to the third example embodiment.

A schematic operation in the service provision phase according to the third example embodiment will be described with reference to FIG. 22. Upon receiving an authentication request, the authentication server 10 determines a corresponding service user ID and encrypted personal information by using its authentication information database. The authentication server 10 transmits a response (a response to the authentication request) including the determined service user ID and personal information to the management server 20. The management server 20 searches its user information database by using the acquired service user ID as a key and determines a corresponding encryption key. The management server 20 decrypts the personal information acquired from the authentication server 10 by using the determined encryption key. The management server 20 transmits the personal information in plain text to an authentication terminal 30. The authentication terminal 30 provides a service by using the personal information.

Next, detailed operations of the authentication server 10 and the individual management server 20 according to the third example embodiment will be described.

When the service registration unit 204 of the authentication server 10 receives a service registration request (a request including a user ID, a password, and a service provider ID) from a management server 20, the service registration unit 204 generates an encryption key (a common key) according to the second example embodiment.

The service registration unit 204 transmits a response including a service user ID and an encryption key generated in response to the service registration request to the management server 20 that has transmitted the service registration request.

The service registration request unit 303 of the management server 20 receives a response to the service registration request. The service registration request unit 303 extracts the encryption key from the response and encrypts personal information (for example, the name, etc.) of the user. After encrypting the personal information, the service registration request unit 303 deletes the personal information in plain text.

The service registration request unit 303 generates a "personal information registration request" including the encrypted personal information and the service user ID and transmits the "personal information registration request" to the authentication server 10.

In addition, the service registration request unit 303 gives the service user ID and the encryption key acquired from the authentication server 10 to the database management unit 304. The database management unit 304 adds a new entry including the service user ID and the encryption key in the user information database (see FIG. 23). As illustrated in FIG. 23, the user information database stores the service user ID and the encryption key in association with each other.

The service registration unit 204 of the authentication server 10 receives the personal information registration request. The service registration unit 204 gives the personal information registration request to the database management unit 203.

The database management unit 203 extracts the service user ID from the personal information registration request and searches the authentication information database by using the ID as a key. The database management unit 203 stores the encrypted personal information in the determined entry. As a result, for example, an authentication information database having a personal information field as illustrated in FIG. 24 is obtained. The authentication information database stores the encrypted personal information in association with the biological information of the user, the user ID, etc.

As illustrated in FIG. 24, encrypted text Enc(U11) of personal information entered by the user U1 to the service provider S1 and encrypted text Enc(U12) of personal information entered by the user U1 to the service provider S2 are registered in the database.

When the authentication unit 205 of the authentication server 10 receives an authentication request (an authentication request including feature values of the user and the service provider ID) from the management server 20, the authentication unit 205 performs authentication processing by using these items of information. If the authentication unit 205 succeeds in the authentication, the service user ID and the encrypted personal information corresponding to the combination of the user and the service provider are determined.

The authentication unit 205 transmits a response (a response to the authentication request) including the determined service user ID and encrypted personal information to the management server 20.

The authentication request unit 305 of the management server 20 searches the user information database by using the acquired service user ID as a key and determines a corresponding encryption key.

The authentication request unit 305 decrypts the encrypted personal information acquired from the authentication server 10 by using the encryption key. The authentication request unit 305 transmits the personal information in plain text to a corresponding authentication terminal 30. If the authentication request unit 305 succeeds in decrypting the personal information, the authentication request unit 305 deletes (discards) the encrypted personal information acquired from the authentication server 10.

As described above, in the authentication system according to the third example embodiment, the encrypted personal information is stored in the authentication server 10, and the encryption key for decrypting the personal information is stored in the management server 20. Normally, robust measures against unauthorized access and the like by a third party are taken for the authentication server 10 installed at an authentication center. In contrast, there are cases in which measures against the above unauthorized access and the like are insufficient for a management server 20 installed at a service provider. Thus, there is a difference in security strength between the authentication server 10 and the management server 20, and personal information is stored in the authentication server 10 having a higher security strength (it is hard to assume that information will leak from the authentication server 10). Thus, compared with the second example embodiment in which the management server 20 stores encrypted personal information, the risk of leakage of encrypted personal information is lower. In addition, while the management server 20 stores the encryption key and the service user ID, such information does not give any useful information to a third party. Thus, even if information is leaked from the management server 20 having a lower security strength, not a serious problem will be caused.

Figure 25:
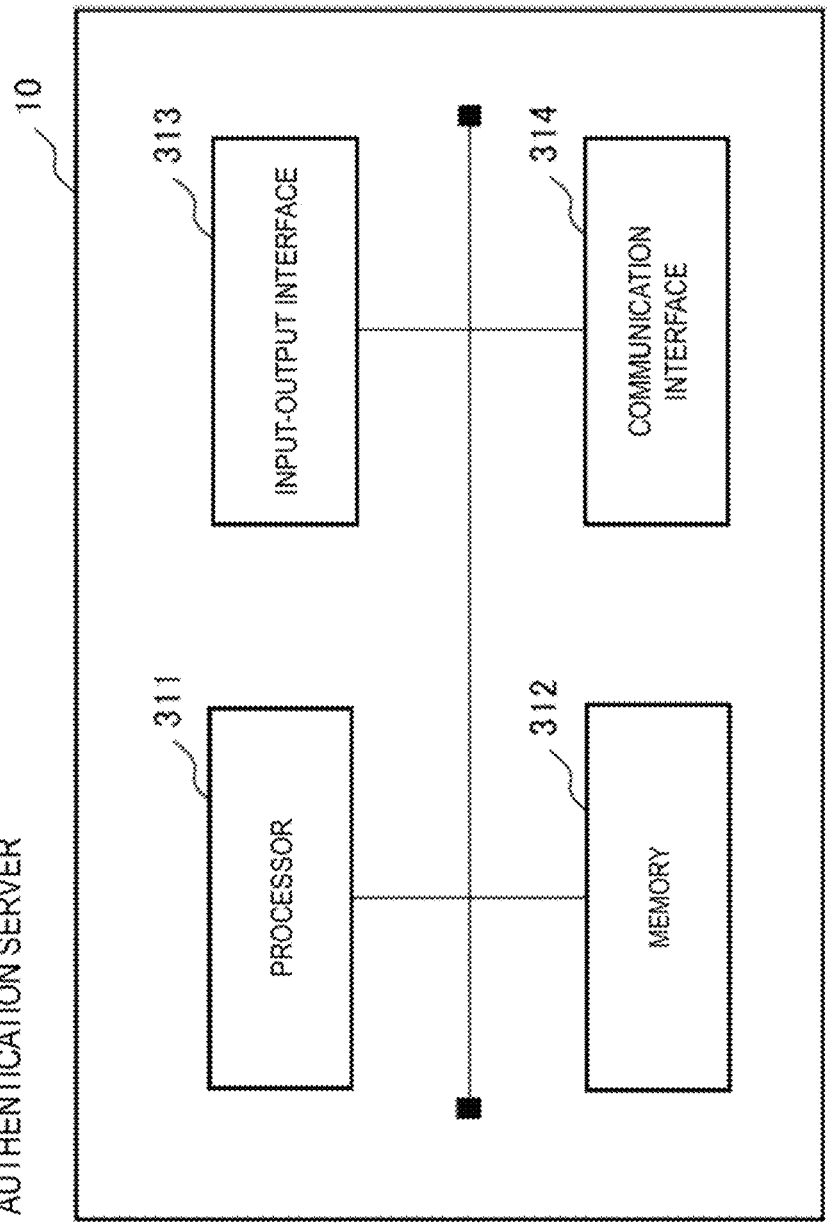
FIG. 25 is a diagram illustrating an example of a hardware configuration of an authentication server.

Next, a hardware configuration of an individual apparatus that constitutes the authentication system will be described. FIG. 25 is a diagram illustrating an example of a hardware configuration of the authentication server 10.

The authentication server 10 can be configured by an information processing apparatus (a so-called computer) and has a configuration illustrated as an example in FIG. 25. For example, the authentication server 10 includes a processor 311, a memory 312, an input-output interface 313, a communication interface 314, etc. The components such as the processor 211 are connected to an internal bus, etc. so that these components can communicate with each other.

The hardware configuration of the authentication server 10 is not limited to the configuration illustrated in FIG. 25. The authentication server 10 may include hardware not illustrated or may be configured without the input-output interface 313 if desired. In addition, the number of components, such as the number of processors 311, included in the authentication server 10 is not limited to the example illustrated in FIG. 25. For example, a plurality of processors 311 may be included in the authentication server 10.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), or the like. The memory 312 stores an OS program, an application program, and various kinds of data.

The input-output interface 313 is an interface for a display device and an input device not illustrated. For example, the display device is a liquid crystal display or the like. For example, the input device is a device, such as a keyboard or a mouse, which receives user operations.

The communication interface 314 is a circuit, a module, or the like for performing communication with other apparatuses. For example, the communication interface 314 includes a NIC (Network Interface Card) or the like.

The functions of the authentication server 10 are realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

The management servers 20, the authentication terminals 30, etc. can each be configured by an information processing apparatus, as in the case of the authentication server 10. As each of these apparatuses can also have the same basic hardware configuration as that of the authentication server 10, description thereof will be omitted. For example, the individual authentication terminal 30 includes a camera for capturing an image of an individual user.

The authentication server 10 includes a computer and can realize its functions by causing the computer to execute a program. In addition, the authentication server 10 executes an authentication server control method by using this program.

[Variations]

The configurations, operations, etc. of the authentication systems according to the above example embodiments are examples and do not limit the present system configuration, etc.

In the above example embodiments, a user (a system user) determines a user ID and a password, and this user registered in the system is determined by the user ID and the password. However, the authentication system may determine an ID (identifier) that uniquely determines the system user. For example, in the user registration phase, the authentication server 10 acquires biological information (a face image or feature values) of a user. The authentication server 10 may generate an ID based on the biological information. For example, the authentication server 10 may calculate a hash value from feature values of a face image and may use the calculated hash value in place of the user ID and the password. Feature values of a face image differ depending on the user, and a hash value generated from these feature values also differs depending on the user. Thus, the hash value can be used as the ID of the system user.

In the above example embodiments, the user registration phase and the service registration phase are performed at different timings. However, these phases may be performed at substantially the same timing. For example, an authentication terminal 30 installed at a service provider from which a user wishes to receive a service may be used for the above registration phases. Specifically, a user may use an authentication terminal 30 to perform user registration (entering biological information, a user ID, and a password) and to continuously perform service registration (entering personal information, the user ID, and the password). In this case, the authentication terminal 30 includes the user registration function (the user registration unit 202) of the authentication server 10 and the personal information acquisition function (the personal information acquisition unit 302) of the management server 20.

A plurality of authentication terminals 30 of a service provider may not need to be installed on the same premises, in the same building, etc. If a plurality of authentication terminals 30 are managed and operated by the same service provider, these authentication terminals 30 may be installed at locations spatially away from each other.

In the above example embodiments, a single service provider ID is assigned to a single service provider. However, a single service provider ID may be assigned to a plurality of service providers. That is, a plurality of service providers may be managed as a group, and a service provider ID may be issued per group. For example, in a case in which the service providers S1 and S2 coordinate with each other and provide the same service, a shared service provider ID may be issued to these service providers S1 and S2.

In the above example embodiments, biological information relating to "feature values generated from a face image" is transmitted from a management server 20 to the authentication server 10. However, biological information relating to "a face image" may be transmitted from a management server 20 to the authentication server 10. In this case, the authentication server 10 generates feature values from the acquired face image and performs authentication processing (matching processing).

In the above example embodiments, an authentication terminal 30 acquires a face image, and the corresponding management server 20 generates feature values from the face image. However, the authentication terminal 30 may generate feature values from a face image and may transmit the generated feature values to the corresponding management server 20. That is, the management server 20 does not need to generate the feature values.

In the above example embodiments, in the service registration phase, when a user registers his or her personal information, the user enters a user ID and a password to a service provider (see FIG. 13). However, in place of the user ID and the password, biological information (a face image) of the user may be entered to the service provider. In this case, the corresponding management server 20 transmits a service registration request including feature values generated from the face image and its service provider ID to the authentication server 10. The authentication server 10 performs matching processing by using the feature values included in the request and the feature values registered in its authentication information database and determines the corresponding user. If the authentication server 10 succeeds in the user determination (authentication), the authentication server 10 issues a service user ID. In this way, even if the user forgets his or her user ID or password, the user can easily perform the service registration. Alternatively, the service provider may acquire biological information (a face image) of a user, in addition to the user ID and the password. In this case, if the user ID, password, and biological information match, the authentication server 10 may issue a service user ID (two-factor authentication using the biological information and password may be performed).

A service provider may cache (temporarily store) information acquired from the authentication server 10 or information acquired from an authentication terminal 30. For example, a management server 20 caches biological information acquired from an authentication terminal 30 and an authentication result (a service user ID) based on the biological information for a predetermined period. Upon acquiring biological information from an authentication terminal 30, first the corresponding management server 20 checks the data cached therein. If there is cached data that matches the acquired biological information, the management server 20 does not transmit an authentication request to the authentication server 10. The management server 20 determines the corresponding personal information by using the service user ID included in the cached data. Alternatively, the management server 20 may cache a combination of biological information and personal information. Alternatively, depending on the kind of the service, a different condition for deleting cached data may be used. For example, if an accommodation service is provided by a hotel company, the management server 20 may delete corresponding cached data when the duration of the stay of the guest ends.

In the above example embodiments, while the authentication server 10 generates an encryption key, the individual management server 20 may generate an encryption key. In this case, in the case of the second example embodiment, a management server 20 generates an encryption key and encrypts personal information. The management server 20 stores the encrypted personal information and the corresponding service user ID in association with each other. Next, the management server 20 transmits the encryption key to the authentication server 10. The authentication server 10 stores the acquired encryption key in association with the corresponding user ID, etc. In the case of the third example embodiment, a management server 20 transmits the encrypted personal information to the authentication server 10. The management server 20 stores the generated encryption key and the corresponding service user ID in association with each other. The authentication server 10 stores the acquired personal information (the encrypted text of the personal information), the corresponding user ID, etc. in association with each other. The management server 20 deletes the original personal information and the encryption key at the timing described in the second or third example embodiment. Since an individual management server 20 generates an encryption key, the number of communications between the authentication server 10 and the management server 20 can be reduced in the case of the third example embodiment.

In the above example embodiments, a common key is used as an encryption key for encrypting personal information. However, "private key" and "public key" may be used as the encryption key for encrypting personal information. In this case, the authentication server 10 stores a private key in association with a user ID, etc. In addition, the authentication server 10 gives a public key to an individual management server 20. The management server 20 uses the public key to encrypt personal information. Upon receiving an authentication request, the authentication server 10 transmits the corresponding service user ID and private key to the management server 20. The management server 20 decrypts the personal information by using the acquired private key.

Data transmission and reception modes among the individual apparatuses (the authentication server 10, the individual management server 20, and the individual authentication terminal 30) are not limited to any particular modes. For example, data transmitted or received among these apparatuses may be encrypted. Among these apparatuses, biological information is transmitted and received. Thus, to appropriately protect the biological information, it is desirable that encrypted data be transmitted and received.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to authentication systems for authentication of customers of retail stores, hotel operators, etc.

A part or the entirety of the example embodiments described above may be described as in the following supplementary notes, but is not limited to the followings.

[Supplementary Note 1]

An authentication server including:
  a user registration unit that acquires a first ID that uniquely determines a user in a system and first biological information that is used for authentication of the user;
  a service registration unit that processes a service registration request that is transmitted from a service provider of a service that the user wishes to use and that includes the first ID and a second ID that identifies the service provider; and
  a storage unit,
  wherein the service registration unit generates a third ID that is uniquely determined by a combination of the user and the service provider and transmits the third ID to the service provider, and
  wherein the storage unit stores the first biological information, the first ID, the second ID, and the third ID in association with each other.

[Supplementary Note 2]

The authentication server according to supplementary note 1, further including an authentication unit that receives an authentication request including second biological information of the user and the second ID from the service provider, determines the third ID by using the first and second biological information and the second ID, and transmits the determined third ID to the service provider.

[Supplementary Note 3]

The authentication server according to supplementary note 1 or 2, wherein the user registration unit acquires a password of the user, and the storage unit stores the first biological information, the first ID, the password, the second ID, and the third ID in association with each other.

[Supplementary Note 4]

The authentication server according to supplementary note 3, wherein the service registration unit calculates a hash value by using the first ID, the password, and the second ID and uses the calculated hash value as the third ID.

[Supplementary Note 5]

The authentication server according to any one of supplementary notes 1 to 4, wherein the first biological information includes a feature value generated from a face image of the user.

[Supplementary Note 6]

An authentication system including:
  an authentication server; and
  a management server,
  wherein the authentication server includes
    a user registration unit that acquires a first ID that uniquely determines a user in the system and first biological information that is used for authentication of the user, a service registration unit that processes a service registration request that is transmitted from a service provider of a service that the user wishes to use and that includes the first ID and a second ID that identifies the service provider, and a first storage unit, wherein the service registration unit generates a third ID that is uniquely determined by a combination of the user and the service provider and transmits the third ID to the service provider, wherein the first storage unit stores the first biological information, the first ID, the second ID, and the third ID in association with each other, and wherein the management server includes a personal information acquisition unit that acquires the first ID and personal information of the user from the user, a service registration request unit that acquires the third ID by transmitting the service registration request to the authentication server, and a second storage unit that stores personal information of the user and the third ID in association with each other.

[Supplementary Note 7]

The authentication system according to supplementary note 6, wherein the authentication server further includes an authentication unit that receives an authentication request including second biological information of the user and the second ID from the service provider, determines the third ID by using the first and second biological information and the second ID, and transmits the determined third ID to the service provider, and wherein the management server further includes an authentication request unit that determines personal information of the user by using the third ID acquired by transmitting the authentication request to the authentication server when a service is provided to the user.

[Supplementary Note 8]

The authentication system according to supplementary note 7, further including an authentication terminal that acquires personal information of the user from the management server by transmitting biological information acquired from the user to the management server and that provides a service to the user by using the acquired personal information.

[Supplementary Note 9]

The authentication system according to supplementary note 8, wherein the authentication server stores a first feature value generated from a face image of the user as the first biological information, wherein the authentication terminal transmits the face image of the user to the management server, and wherein the management server uses a second feature value generated from the face image as the second biological information.

[Supplementary Note 10]

The authentication system according to any one of supplementary notes 6 to 9, wherein the personal information does not include biological information of the user.

[Supplementary Note 11]

A control method of an authentication server, the control method including:

acquiring a first ID that uniquely determines a user in a system and first biological information that is used for authentication of the user;

receiving a service registration request that is transmitted from a service provider of a service that the user wishes to use and that includes the first ID and a second ID that identifies the service provider;

generating a third ID that is uniquely determined by a combination of the user and the service provider;

transmitting the third ID to the service provider; and storing the first biological information, the first ID, the second ID, and the third ID in association with each other.

[Supplementary Note 12]

A computer-readable storage medium storing a program causing a computer mounted on an authentication server to perform processing for:

acquiring a first ID that uniquely determines a user in a system and first biological information that is used for authentication of the user;

receiving a service registration request that is transmitted from a service provider of a service that the user wishes to use and that includes the first ID and a second ID that identifies the service provider;

generating a third ID that is uniquely determined by a combination of the user and the service provider;

transmitting the third ID to the service provider; and storing the first biological information, the first ID, the second ID, and the third ID in association with each other.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST

10, 100 authentication server
20 management server
30 authentication terminal
40 terminal
101, 202 user registration unit
102, 204 service registration unit
103, 206, 306, 405 storage unit
201, 301, 401 communication control unit
203, 304 database (DB) management unit
205 authentication unit
302 personal information acquisition unit
303 service registration request unit
305 authentication request unit
311 processor
312 memory
313 input-output interface
314 communication interface
402 biological information acquisition unit
403 service provision unit
404 message output unit

What is claimed is:

1. An authentication server comprising:
at least one memory storing a set of instructions; and
at least one processor configured to execute the set of instructions to:

acquire a first ID that uniquely determines a user in a system and first biological information that is used for authentication of the user; and process a service registration request that is transmitted from a service provider of a service that the user wishes to use and that includes the first ID and a second ID that identifies the service provider, wherein the at least one processor is further configured to execute the set of instructions to:

generate a third ID that is uniquely determined by a combination of the user and the service provider;

transmit the third ID to the service-provider; and store the first biological information, the first ID, the second ID, and the third ID in association with each other, and wherein storing the first biological information, the first ID, the second ID, and the third ID in association with each other comprises storing the biological information, the first ID, the second ID, and the third ID in a same table.

2. The authentication server according to claim 1, wherein the at least one processor is further configured to execute the set of instructions to:

receive an authentication request including second biological information of the user and the second ID from the service provider;

determine the third ID by using the first and second biological information and the second ID; and transmit the determined third ID to the service provider.

3. The authentication server according to claim 1, wherein the at least one processor is further configured to execute the set of instructions to:

acquire a password of the user; and store the first biological information, the first ID, the password, the second ID, and the third ID in association with each other.

4. The authentication server according to claim 3, wherein the at least one processor is further configured to execute the set of instructions to:

calculate a hash value by using the first ID, the password, and the second ID; and use the calculated hash value as the third ID.

5. The authentication server according to claim 1, wherein the first biological information includes a feature value generated from a face image of the user.

6. The authentication server according to claim 1, wherein generating the third ID comprises combining the first ID and the second ID as the combination.

7. The authentication server according to claim 1, wherein the at least one processor is further configured to execute the set of instructions to, based on the third ID, process implementation of a second service, other than the service, requested by the user.

8. An authentication system comprising:

an authentication server; and a management server, wherein the authentication server includes at least one memory storing a set of instructions; and at least one processor configured to execute the set of instructions to:

acquire a first ID that uniquely determines a user in the system and first biological information that is used for authentication of the user;

process a service registration request that is transmitted from a service provider of a service that the user wishes to use and that includes the first ID and a second ID that identifies the service provider, wherein the at least one processor is further configured to execute the set of instructions to:

generate a third ID that is uniquely determined by a combination of the user and the service provider and transmits the third ID to the service provider; and store the first biological information, the first ID, the second ID, and the third ID in association with each other, wherein storing the first biological information, the first ID, the second ID, and the third ID in association with each other comprises storing the biological information, the first ID, the second ID, and the third ID in a same table, and wherein the management server includes at least one memory storing a set of instructions; and at least one processor configured to execute the set of instructions to:

acquire the first ID and personal information of the user from the user;

acquire the third ID by transmitting the service registration request to the authentication server; and store personal information of the user and the third ID in association with each other.

9. The authentication system according to claim 8, wherein the at least one processor of the authentication server is further configured to execute the set of instructions to:

receive an authentication request including second biological information of the user and the second ID from the service provider;

determine the third ID by using the first and second biological information and the second ID; and transmit the determined third ID to the service provider, and wherein the at least one processor of the management server is further configured to execute the set of instructions to:

determine personal information of the user by using the third ID acquired by transmitting the authentication request to the authentication server when a service is provided to the user.

10. The authentication system according to claim 9, further comprising an authentication terminal that acquires personal information of the user from the management server by transmitting biological information acquired from the user to the management server and that provides a service to the user by using the acquired personal information.

11. The authentication system according to claim 10, wherein the authentication server stores a first feature value generated from a face image of the user as the first biological information, wherein the authentication terminal transmits the face image of the user to the management server, and wherein the management server uses a second feature value generated from the face image as the second biological information.

12. The authentication system according to claim 8, wherein the personal information does not include biological information of the user.

13. A control method of an authentication server, the control method comprising:
- acquiring a first ID that uniquely determines a user in a system and first biological information that is used for authentication of the user;
- receiving a service registration request that is transmitted from a service provider of a service that the user wishes to use and that includes the first ID and a second ID that identifies the service provider;
- generating a third ID that is uniquely determined by a combination of the user and the service provider;
- transmitting the third ID to the service provider; and
- storing the first biological information, the first ID, the second ID, and the third ID in association with each other,
- wherein storing the first biological information, the first ID, the second ID, and the third ID in association with each other comprises storing the biological information, the first ID, the second ID, and the third ID in a same table.

* * * * *